(12) United States Patent
Barron et al.

(10) Patent No.: US 10,949,958 B2
(45) Date of Patent: Mar. 16, 2021

(54) FAST FOURIER COLOR CONSTANCY

(71) Applicant: Google LLC, Mountain View, CA (US)

(72) Inventors: Jonathan Barron, Alameda, CA (US); Yun-Ta Tsai, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 70 days.

(21) Appl. No.: 16/342,911

(22) PCT Filed: Nov. 14, 2017

(86) PCT No.: PCT/US2017/061568
§ 371 (c)(1),
(2) Date: Apr. 17, 2019

(87) PCT Pub. No.: WO2018/093785
PCT Pub. Date: May 24, 2018

(65) Prior Publication Data
US 2020/0051225 A1    Feb. 13, 2020

Related U.S. Application Data

(60) Provisional application No. 62/422,496, filed on Nov. 15, 2016.

(51) Int. Cl.
*G06T 5/40* (2006.01)
*G06T 7/90* (2017.01)

(52) U.S. Cl.
CPC ............... *G06T 5/40* (2013.01); *G06T 7/90* (2017.01); *G06T 2207/10024* (2013.01); *G06T 2207/20076* (2013.01); *G06T 2207/20081* (2013.01)

(58) Field of Classification Search
None
See application file for complete search history.

(56) References Cited

U.S. PATENT DOCUMENTS 9,336,582 B1    5/2016    Barron

OTHER PUBLICATIONS

Barron and Tsai; "Fast Fourier Color Constancy", IEEE Computer Society Conference on Computer Vision and Pattern Recognition, Proceedings, IEEE Computer Society, US, Jul. 21, 2017, pp. 6950-6958.

(Continued)

*Primary Examiner* — Vikkram Bali
(74) *Attorney, Agent, or Firm* — McDonnell Boehnen Hulbert & Bergoff LLP

(57) ABSTRACT

Methods for white-balancing images are provided. These methods include determining, for an input image, a chrominance histogram for the pixels of the input image. The determined histogram is a toroidal chrominance histogram, with an underlying, toroidal chrominance space that corresponds to a wrapped version, of a standard flat chrominance space. The toroidal chrominance histogram is- then convolved with a fitter to generate a two-dimensional heat map that is then used to determine art estimated chrominance of iIlummaiioB present id the input image; This can include fitting a bivariate von Mises distribution, or some other circular and/or toroidal, probability distribution, to the determined two-dimensional heat map. These methods for estimating illumination chrominance values for input images have reduced computational costs and increased speed relative to other methods for determining image illuminant chrominance values.

20 Claims, 8 Drawing Sheets

(56) References Cited

OTHER PUBLICATIONS

Barron, "Convolutional Color Constancy", 2015 IEEE International Conference on Computer Vision (ICCV), IEEE, Dec. 7, 2015, pp. 379-387.

International Search Report and Written Opinion dated Jan. 23, 2018 for International Application No. PCT/US2017/061568, 13 pages.

440

430

420

410

FAST FOURIER COLOR CONSTANCY

CROSS-REFERENCE TO RELATED APPLICATION

This application is a U.S. National Phase Application of International Patent Application No. PCT/US2017/061568, filed Nov. 14, 2017 which claims priority to U.S. Provisional Patent Application No. 62/422,496, filed Nov. 15, 2016, which are hereby incorporated by reference in their entireties.

BACKGROUND

White balancing, or color correction, of images refers to the process of changing the color of an image of a scene to correct for the color of illumination used to generate the image, to improve the aesthetics of the image, or to provide some other benefit. Color correction can include using information about the 'true' color of contents of the image (e.g., of a palette or reference colors that are present in the scene) to determine the color of the illumination, and using that determined color to change the color of the image. In other embodiments, color correction can include determining the statistics of the color of pixels in the image (e.g., determining a histogram of color values of pixels within the image) and using the determined statistics to predict the color of the illumination.

SUMMARY

A variety of applications include adjusting the color of images, e.g., to compensate for properties of the image capture apparatus, such as relative spectral sensitivities of pixels of a camera used to generate the images, to compensate for the illumination present in a scene represented by the images, and/or to improve the aesthetics of the images. This process may be called color correction, or white balancing, and can be characterized as determining the chrominance of the illumination that illuminated the scene to permit image capture of the scene. This process can also include determining statistics for an image (e.g., determining the distribution of color across the pixels of the image) and adjusting the colors of the pixels of the image (e.g., scaling each color channel of the image) such that the statistics of the adjusted image match the expected statistics of a scene (e.g., such that the mean color in the image is grey). However, such statistical methods can perform poorly in scenarios where their underlying assumptions are violated.

The present disclosure provides a variety of methods for translating the color correction problem into a problem of object identification and/or detection. These methods include constructing a histogram of the color (e.g., chroma) of the pixels of the image in a transformed chroma space such that translations of the determined histogram within the transformed chroma space correspond to changing the overall illumination chrominance of the image. Generating a histogram in such a transformed color space could include applying a logarithmic transformation to the chroma information for the pixels of the image. The chroma of illumination in the image can then be determined using object recognition techniques, e.g., to locate a centroid of the determined histogram within the transformed chroma space. Such techniques could include applying a filter (e.g., via convolution) to the histogram and using the filtered histogram to determine a location within the transformed chroma space (e.g., by selecting a maximum of the filtered histogram) corresponding to the chroma of the illumination represented in the image.

However, using such a method to determine the illumination chrominance for an image at a desired level of chroma resolution may require the determination of very large histograms and/or the convolution of large filters with such large histograms. Such processes can be computation-intensive, precluding their implementation using certain systems (e.g., digital cameras) and/or precluding their application in "real time" to video streams. In order to speed up the process, the chroma histogram for an image could be determined in a wrapped, toroidal chrominance space. That is, each element of such a histogram could represent the number of pixels in the image that are located at a regularly spaced set of points within the transformed chroma space. As a result, the chroma space 'wraps' around both edges of the histogram. By applying such a 'wrapping,' the size of the determined histogram can be significantly reduced without sacrificing resolution within the chroma space. Accordingly, the method can be used to determine the illumination chrominance for an image in less time and/or using less computational power. Once the method is used to determine an illumination chroma in the 'wrapped' chroma space, the illumination chroma within the non-wrapped chroma space can be determined (e.g., via a de-aliasing process).

The filter(s) used to perform the methods herein could be determined based on a corpus of training images and ground-truth illumination chrominances thereof. The filters could be trained according to gradient descent or some other technique using the corpus of training images. The trained filters can then be transmitted to and/or incorporated in cellphones, cameras, or other devices that can generate images and apply the trained filter thereto.

Thus the method may involve a obtaining an input image. The input image may have a white point represented by chrominance values that define white color in the input image. The first example embodiment may also involve, based on colors of the input image, generating a two-dimensional chrominance histogram of the input image. The first example embodiment may further involve convolving the two-dimensional chrominance histogram with a filter to create a two-dimensional map, which may be considered as a "heat map". Entries in the two dimensional heat map may represent respective estimates of how close respective tints corresponding to the respective entries are to the white point of the input image. More particularly entries in the two-dimensional heat map may represent respective pluralities of estimates of how close respective tints corresponding to the respective entries are to the white point of the input image—that is, each entry in the heat map may comprise an estimate of to a respective tint. In some implementations the convolving is performed in the frequency domain, and in particular a Fourier transform may be used for the convolving. The first example embodiment may additionally involve selecting an entry in the two-dimensional map that represents a particular value that is within a threshold of a maximum value in the map, and based on the selected entry, tinting the input image to form an output image. The selected entry may define a tint, more particularly a tint of the illumination, which may be termed the illumination chrominance. More particularly therefore this may involve selecting a particular estimate from the respective plurality of estimates associated with the selected entry, which may be considered to be an estimated illumination chrominance. Based on the particular estimate, the input image may be tinted to form the output image. Thus the method may involve determining an illumination chrominance for the input image based on the two-dimensional heat map, and tinting the input image to generate a color-corrected output image based on the determined illumination chrominance. More particularly this may be achieved by dividing image color values by color values of the illumination, since an input image pixel color is typically the product of a true color and an illumination color.

As described above, the toroidal chrominance histogram may comprise a histogram of the chrominance of the input image, for example in two dimensions u and v. As an example, toroidal may mean that each of the two dimensions wraps around such that more than one chrominance value of the input image maps to the same value in the toroidal chrominance histogram. This may be achieved by using modular arithmetic such that larger chrominance values "wrap around" to smaller chrominance values.

In some implementations, each element of the toroidal chrominance histogram may correspond to a number of pixels of the input image having chrominance values at a respective set of locations within a chrominance space. In some examples, the set of locations within the chrominance space for a particular element of the toroidal chrominance histogram may be regularly spaced within the chrominance space.

As previously described, in some implementations the convolving is performed in the chrominance frequency domain. The toroidal chrominance histogram facilitates the use of a periodic or cyclic convolution such as a Fourier transform, which can reduce computational load. The convolutional filter may be learned, for example using a loss function based upon a ground truth illumination chrominance and an estimated illumination chrominance. In this case the learned weights, which may be period n×n "images", may be re-parameterized as Fourier transform vectors for faster learning.

As previously described, the toroidal chrominance mapping can be considered as aliasing the problem down to a smaller size. Thus selecting an entry in the 2D map, in effect selecting a tint, may implicitly involve de-aliasing. This de-aliasing may explicitly involve disambiguating between more than one possible estimated illumination chrominance. This may be achieved in many ways. For example, the estimated illumination chrominance may be selected to provide an average image color which is as neutral as possible ("gray world de-aliasing"); or the estimated illumination chrominance may be assumed to be as close to the centre of the histogram as possible, with careful initial choice is the histogram span. Other methods are also possible.

In some implementations, the toroidal chrominance histogram comprises a histogram of the log-chrominance of the input image. This is advantageous because in this space tinting of an image merely translates the histogram. However, it is not essential as the method still works, albeit with potentially more limited range, without this approach.

Thus in some implementations the method may include de-aliasing the selected entry and tinting the input image based on the de-aliased selected entry to form the output image. This may be performed by determining average chrominance values for the input image and selecting a particular estimated luminance from a plurality of estimates associated with the selected entry such that tinting the input image to form an output image based on the particular estimated luminance causes the output image to exhibit a greater degree of neutral color than the input image. Additionally or alternatively the de-aliasing may comprise selecting a particular estimated luminance from a plurality of estimates associated with the selected entry such that the particular estimated luminance is closer to a center of the toroidal chrominance histogram than any other estimate in the plurality of estimates associated with the selected entry.

In some implementations the method may further comprise determining a loss value based on the selected entry and updating the filter based on the loss value. For example the loss value may be determined from a loss function which is dependent upon the two-dimensional map, for example dependent upon an overall shape and/or a distribution of patterns within the map. The filter may be trained using training images; the loss value may be used to update the filter according to a backpropagation method such as gradient ascent or descent, or according to another machine learning algorithm.

In some implementations selecting the entry in the two-dimensional map that represents the particular value that is within the threshold of the maximum value in the heat map may comprise mapping a per-color probability distribution function associated with the particular value to a bivariate von Mises distribution, wherein the bivariate von Mises distribution is estimated using a mean and a covariance matrix.

The filter may be determined by way of machine learning over a plurality of training images, in particular with associated ground-truth white points. This may include minimizing a loss function to determine the filter. The loss function may be based on or include a negative log-likelihood of a Gaussian distribution defined by the mean and the covariance matrix.

In some implementations tinting the input image based on the selected entry may comprise applying the filter to the image. The filter may be parameterized by the selected entry. The output image may be more white-balanced than the input image.

A digital image may be obtained, for example by a computing device capturing the digital image. The method may then include constructing the input image as an n×n image that is smaller than the digital image. For example each pixel of the input image may be a sum of values associated with a set of pixels in the digital image that are separated by a multiple of n in either dimension.

In some examples, a method can include obtaining, by a computing device, an input image. The input image can include a plurality of pixels having respective colors. The second example embodiment may further involve, based on the colors of the pixels of the input image, generating a toroidal chrominance histogram. Each element of the toroidal chrominance histogram may correspond to a number of pixels of the input image having chrominance values at a respective set of locations within a chrominance space such that the set of locations within the chrominance space for a particular element of the toroidal chrominance histogram are regularly spaced within the chrominance space. The second example embodiment may additionally involve convolving the toroidal chrominance histogram with a filter to generate a two-dimensional heat map. The second example embodiment may yet further involve determining an illumination chrominance for the input image, wherein based on the two-dimensional heat map. The second example embodiment may additionally include, based on the determined illumination chrominance, tinting the input image to generate a color-corrected output image.

The toroidal chrominance histogram of the second example embodiment may be a toroidal logarithmic chrominance histogram. A central element of the toroidal chrominance histogram of the second embodiment may be located within a central region of the toroidal chrominance histogram such that a particular one of the set of locations within the chrominance space corresponding to the central element of the toroidal chrominance histogram corresponds to an expected illumination chrominance. In some examples of the second embodiment, determining an illumination chrominance for the input image may include: (i) selecting one of the elements of the toroidal chrominance histogram; (ii) selecting, from the set of locations within the chrominance space that corresponds to the selected element of the toroidal chrominance histogram, a location within the chrominance space; and (iii) determining the illumination chrominance for the input image based on the selected location within the chrominance space. The second embodiment may additionally involve determining a mean chrominance of the input image. In such examples, selecting, from the set of locations within the chrominance space that corresponds to the selected element of the toroidal chrominance histogram, a location within the chrominance space may include selecting, from the set of locations within the chrominance space, the location within the chrominance space that is most similar to the mean chrominance of the input image. In some examples, determining an illumination chrominance for the input image based on the two-dimensional heat map may include determining a circular mean of the two-dimensional heat map. Determining an illumination chrominance for the input image based on the two-dimensional heat map may further include determining a covariance of the two-dimensional heat map about such a determined circular mean. Such a determined circular mean and covariance of the two-dimensional heat map could correspond to a mean and a covariance of a bivariate von Mises distribution.

In some examples of the second embodiment, the input image is a first input image, and the method further includes: (i) obtaining a second input image that includes a second plurality of pixels having second respective colors; (ii) based on the colors of the pixels of the second input image, generating a second toroidal chrominance histogram, where each element of the second toroidal chrominance histogram corresponds to a number of pixels of the second input image having chrominance values at a second respective set of locations within the chrominance space, and where the second set of locations within the chrominance space for a second particular element of the second toroidal chrominance histogram are regularly spaced within the chrominance space; (iii) convolving the second toroidal chrominance histogram with the filter to generate a second two-dimensional heat map; and (iv) based on the second two-dimensional heat map and the illumination chrominance determined for the first input image, determining a second illumination chrominance for the second input image.

The second embodiment may additionally involve (i) determining an augmented image based on the input image, wherein the augmented image comprises a further plurality of pixels having further respective colors; (ii) based on the colors of the pixels of the augmented image, generating an augmented toroidal chrominance histogram, where each element of the augmented toroidal chrominance histogram corresponds to a number of pixels of the augmented image having chrominance values at a further respective set of locations within the chrominance space, and where the further set of locations within the chrominance space for a further particular element of the augmented toroidal chrominance histogram are regularly spaced within the chrominance space; (iii) convolving the augmented toroidal chrominance histogram with a further filter to generate an augmented two-dimensional heat map; and (iv) where determining the illumination chrominance for the input image comprises determining the illumination chrominance based on the augmented two-dimensional heat map.

The methods described herein may be performed by a processor executing program instructions stored in the memory of an image capture device, which may be embodied in a computing device.

In some examples, a method can include (i) obtaining, by a computing device, a plurality of input images, wherein each input image in the plurality of input images includes a plurality of pixels having respective colors; (ii) obtaining, by the server, a plurality of illumination chrominances, where each illumination chrominance in the plurality of illumination chrominances corresponds to a respective input image in the plurality of input images; (iii) based on the colors of the pixels of a first input image in the plurality of input images, generating a toroidal chrominance histogram, where each element of the toroidal chrominance histogram corresponds to a number of pixels of the first input image having chrominance values at a respective set of locations within a chrominance space, and where the set of locations within the chrominance space for a particular element of the toroidal chrominance histogram are regularly spaced within the chrominance space; (iv) convolving the toroidal chrominance histogram with a filter to generate a two-dimensional heat map; (v) determining an estimated illumination chrominance for the first input image, where the illumination chrominance is determined based on the two-dimensional heat map; (vi) determining a difference between the estimated illumination chrominance and a first illumination chrominance, in the plurality of illumination chrominances, that corresponds to the first input image; (vii) updating the filter, based on the determined difference between the estimated illumination chrominance and the first illumination chrominance, to generate an updated filter, and (viii) transmitting, by the server, an indication of the updated filter to a remote system.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
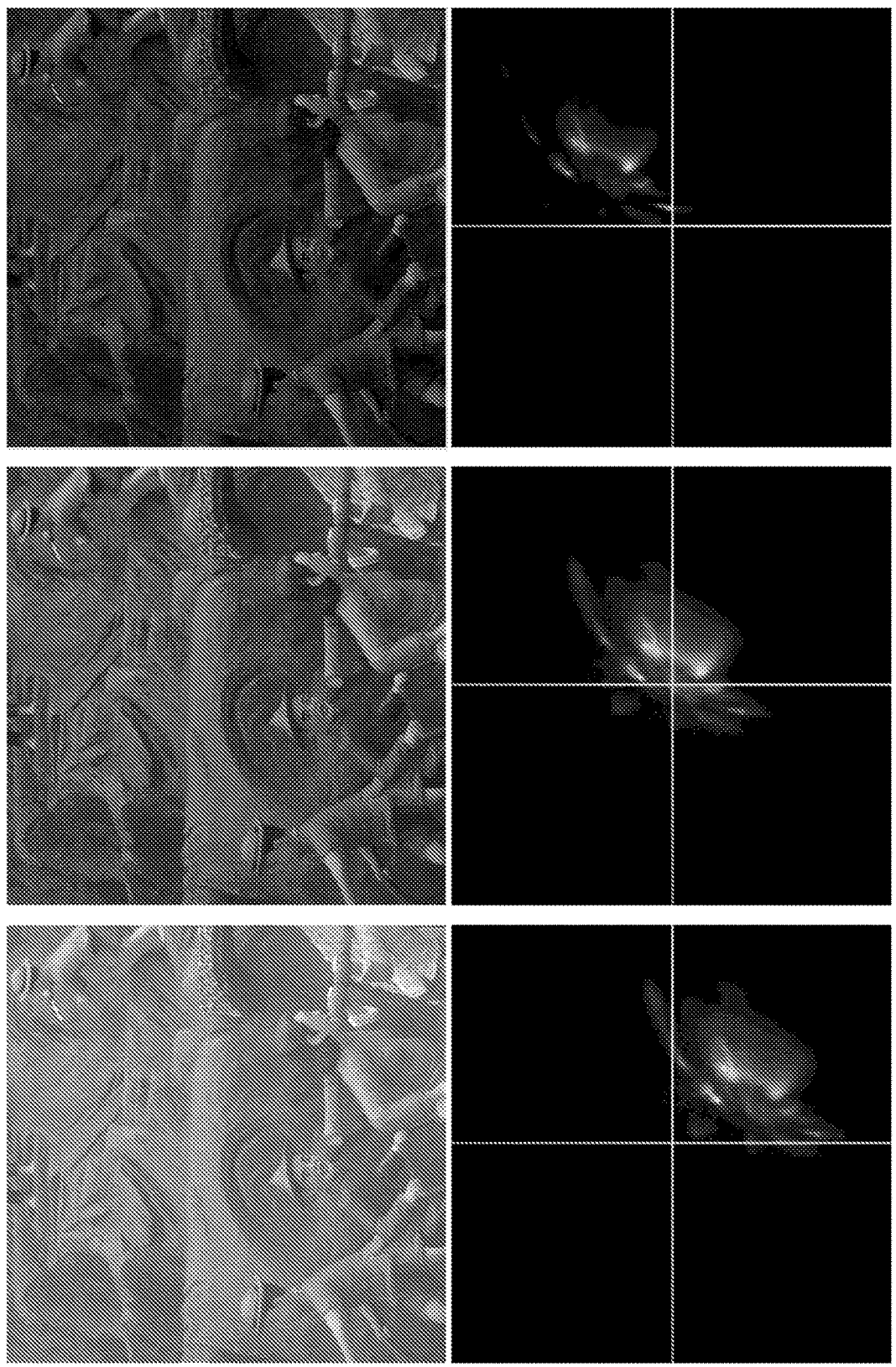
FIG. 1 depicts three tints of an image and associated chrominance histograms for each, according to example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein. Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Example Color Models

This section describes, in a general sense, ways in which color may be represented on a computer screen or in an image file. This information may be useful in the context of the image processing techniques described in the following sections.

Captured images can be digitally represented using a number of color models. For example, the red-green-blue (RGB) color model may be used for display of images on electronic output devices, such as computer screens. RGB is an additive color model in which red, green, and blue light are added together in various ways to produce a spectrum of colors. For instance, cyan may be formed by combining green and blue, yellow may be formed by combining red and green, magenta may be formed by combining red and blue, and white may be formed by combining red, green, and blue.

A particular pixel of an RGB image may be expressed as a three-plane tuple (R,G,B), each plane of which can vary from 0 to a pre-defined maximum value (e.g., 255). If all of the planes are 0, the result may be black. If all of the planes are at the maximum value, the result may be the brightest representable white. (The color planes described herein may also be referred to as color channels.)

Another color model is YCbCr. In some implementations, this color model may be used as an alternative representation of an image. Particularly, the Y plane may represent the brightness of a pixel, and the Cb and Cr planes may represent the blue-yellow chrominance and red-green chrominance, respectively. For instance, the blue-yellow chrominance may be represented by the blue pixel value in an RGB image divided by the green pixel value in the RGB image, and the red-green chrominance may be represented by the red pixel value in the RGB image divided by the green pixel value in the RGB image. Thus, the YCbCr color model has a well-defined relationship with the RGB color model and can be converted to and from this RGB with relative ease.

II. EXAMPLE WHITE-BALANCING

White-balancing is an adjustment that a digital camera device, or associated software, can make to a captured image in an attempt to ensure that the white color in the image properly reflects the actual white colors in the real-world scene from which the image was captured. To understand white-balance, it is helpful to first understand the concept of the concept of color temperature.

Color temperature measures the quality of a light based on the ratio of the amount of blue light to the amount of red light in an image or scene. Color temperature is expressed in units of Kelvin (K) degrees. An image or scene with higher color temperature (i.e., a larger Kelvin value) has more blue than an image or scene with lower color temperature (i.e., smaller Kelvin value). Thus, a "cooler" light has a higher color temperature, while a warmer light has a lower color temperature.

The human eyes and brain can adjust to different color temperatures. For instance, humans see a white object as white regardless of whether it is viewed under strong sunlight or in a room illuminated with incandescent lights. Digital camera devices usually have built-in sensors to measure the color temperature of a scene, and may use an algorithm to process captured images of the scene so that the final result is close to how a human would perceive the scene. This adjustment to make the white colors in the image resemble the white colors in the scene is referred to as white-balancing or color correction. Such a process may include estimating the chrominance of illumination used to illuminate the scene (thus permitting the original capture of the image to be white-balanced) and using the estimated illumination chrominance to adjust the colors of the image (e.g., by tinting the image). Current white-balance algorithms may generate inaccurate estimates of the illumination chrominance. As a result, the white point of an image white-balanced using such methods may not resemble the white point of the scene the image represents. (The white point of an image represents the chrominance values that define "white" in the image.)

The embodiments herein provide high-quality white-balance techniques that can operate with a wide range of image sensor hardware. These techniques are specified to require fewer computational resources (e.g., memory, processor cycles) than prior algorithms, permitting the use of the techniques described herein to white-balance images acquired in real-time, or near-real-time, in software (e.g., to provide a white-balanced video stream representing the view from an image sensor over time). This may obviate the need for hardware-specific white-balance algorithms to be provided with various image sensors or devices.

To achieve this goal, the embodiments herein translate an input image into a histogram in a two-dimensional chroma space. Each element of the histogram represents a number of pixels in the input image that have colors (or chroma values) at a respective location within the two-dimensional chroma space. Thus, the input image is translated into a shape in the chroma space. The chroma space is specified such that translation of an object (e.g., a histogram corresponding to an input image) within the chroma space corresponds to a tinting of the image and/or a change in the white point or white balance of the image. For example, the elements of the chrominance histogram could be spaced within the two-dimensional chroma space according to a logarithmic scale (i.e., the chrominance histogram could be a logarithmic chrominance histogram). Accordingly, techniques used for object detection and/or location within images can be applied to determine a white point (and/or a corresponding illumination chrominance) for the input image. The input image can then be tinted or otherwise processed, based on the determined white point, to generate a white-balanced output image.

Because the embodiments described herein translate the problem of white balancing to a problem of object detection and location, it is not necessary to calibrate these algorithms for application to images taken with different image capture apparatus (e.g., different image sensors, different cameras). This means that if one camera produces images that are consistently tinted cyan, and another camera produces images that are consistently tinted purple, for example, the white-balance algorithms herein may produce the same white-balanced output image (assuming both images have similar radiometric properties—that the black level has been corrected, that the images are linear, etc.). This means that if the white-balance algorithm herein is trained (e.g., by way of one or more machine learning or other techniques described herein) on images captured by one manufacturer's hardware, it should still work well on images captured by another manufacturer's hardware.

This property of the algorithms described herein also simplifies training. Typically, implementing a white-balance algorithm for a new camera sensor involves collecting a large dataset of images with that sensor, and manually annotating the illuminant color for each of those images, which is a slow and expensive proposition. But with the approach described herein, a white-balance algorithm can be trained based on publicly-available images, so that the white-balance algorithm reproduces the white-balance of those images.

The white-balance algorithm herein not only produces high quality results, but it currently outperforms the state-of-the-art in the academic literature by a 10/*-12% reduction in error while being 250-3000 times faster to compute. Further, the methods improve over the current state-of-the-art techniques in that the current state-of-the-art techniques are not designed to generalize across different image sensors. Further, the algorithms herein permit the determination of a complete posterior distribution over the space of possible illuminant chrominances. Such posterior information can be used to implement temporal smoothing when applying the algorithm to white-balancing images of video streams.

In order to frame the problem formally, consider a perfectly photometric linear image, in which black-level correction has already occurred and in which no pixel values are saturated (e.g., the intensities of the colors in each color channel of the pixel are below some threshold value, such as 255). Log-space representations may be used below for convenience.

As noted above, an RGB pixel $[I_r, I_g, I_b]$ may be a product of a "true" or white-balanced color $[W_r, W_g, W_b]$ and an illuminant of the scene $[L_r, L_g, L_b]$. Accordingly:

$$I_r = W_r L_r \quad (1)$$

$$I_g = W_g L_g \quad (2)$$

$$I_b = W_b L_b \quad (3)$$

Nonetheless, Equations (1), (2), and (3) are an oversimplification of the problem, as they ignore shading, reflectance properties, spatially-varying illumination, etc. Regardless, given I, a goal is to estimate L and with that, to produce an estimated white-balanced image pixel W=I/L. To that end, chrominance representations for I and W can be defined:

$$I_u = \log(I_g/I_r) \quad (4)$$

$$I_v = \log(I_g/I_b) \quad (5)$$

$$W_u = \log(W_g/W_r) \quad (6)$$

$$W_v = \log(W_g/W_b) \quad (7)$$

Chrominance histograms could be generated for input images based on such a mapping (e.g., based on the $I_u$ and $I_v$ determined for the pixels of the input image according to Equations (4) and (5)). The bin widths/locations for such a histogram could be specified to facilitate a particular application and/or mapping within a chrominance space. For example, equally-spaced bins within such a space could be used to generate a chrominance histogram. Such a chrominance histogram, having regularly-space bins within the logarithmic chrominance space, could be referred to as a logarithmic chrominance histogram.

Since the absolute scaling of W need not be explicitly considered in the embodiments herein, the problem of estimating the illuminant L simplifies further to estimating the chrominance of L, which can just be represented as two numbers:

$$L_u = \log(L_g/L_r) \quad (8)$$

$$L_v = \log(L_g/L_b) \quad (9)$$

By the properties of logarithms, the formulation of Equations (1), (2), and (3) can be rewritten in log-chrominance space as:

$$W_u = I_u - L_u \quad (10)$$

$$W_v = I_v - L_v \quad (11)$$

As a consequence, correcting the white-balance of an image reduces to determining two quantities: $L_u$ and $L_v$. Because of the absolute scale ambiguity, the inverse mapping from RGB space to the UV space of $(L_u, L_v)$ is undefined. Therefore, determining $L_u$ and $L_v$, it can be assumed that L is unit-norm which allows recovery of $(L_r, L_g, L_b)$:

$$L_r = \frac{\exp(-L_u)}{z} \quad (12)$$

$$L_g = \frac{1}{z} \quad (13)$$

$$L_b = \frac{\exp(-L_v)}{z} \quad (14)$$

$$z = \sqrt{\exp(-L_u)^2 + \exp(-L_v)^2 + 1} \quad (15)$$

This log-chrominance formulation is simpler to work with than the RGB formulation. There are 2 unknowns instead of 3, and there is a linear constraint relating W and I instead of a multiplicative constraint.

In order to determine these values $(L_u, L_v)$ and ultimately $(L_r, L_g, L_b)$ for an input image I with ground truth illumination L, a two-dimensional chrominance histogram N may be constructed. In this histogram, N(u,v) indicates the number of pixels in I whose chrominance is near (u,v). Formally:

$$N(u, v) = \sum_i \left[ \left( |I_u^{(i)} - u| \leq \frac{\epsilon}{2} \right) \wedge \left( |I_v^{(i)} - v| \leq \frac{\epsilon}{2} \right) \right] \quad (16)$$

where the square brackets represent an indicator function, and ε is the bin-width of the histogram. A chrominance histogram determined according to Equation (16), having regularly-spaced bins in a logarithmic chrominance space, may be referred to as a logarithmic chrominance histogram.

After constructing the histogram N, it may be normalized to have a constant mass. Further, the square root of the count in each bin may be taken, which may improve the effectiveness of the histogram's features. Nonetheless, any ad-hoc normalization is possible as long as the same transformation is applied to the entire histogram.

FIG. 1 contains three tinted versions of the same image in the top row, and each image's corresponding chrominance histogram (determined according to Equation (16) above) in the bottom row. FIG. 1 depicts these images in black and white using different levels of brightness to present different pixel colors/chrominances. In color versions of the images in FIG. 1, the image in the left column is tinted greenish yellow, the image in the middle column is white-balanced, and the image in the right column is tinted reddish yellow.

Moving from the left end to the right end of the x-axis of each chrominance histogram represents changing the blue-yellow tint of the associated image from a dominant blue to a dominant yellow. Likewise, moving from the top end to the bottom end of the y-axis of each chrominance histogram represents changing the red-green tint of the associated image from a dominant red to a dominant green. Overall, each chrominance histogram represents the relative number of pixels with a chrominance falling in each position on this x-y chrominance plot. Thus, the cluster of points in the left-column chrominance histogram indicates a green and yellow tint, the cluster of points in the middle-column chrominance histogram indicates a neutral (white-balanced) tint, and the cluster of points in the right-column chrominance histogram indicates a red and yellow tint.

The center of each cluster of points represents the white point of the associated image, and the origin of the chrominance histogram is what looks "white" to a human. By tinting an image such that the cluster of points in the chrominance histogram of the tinted image is centered near the origin of the chrominance histogram, a neutral tint may be achieved.

The chrominance histogram of each image is a translated version of the other chrominance histograms (ignoring the sampling introduced by the histogram operation), and the shape of the histogram does not change. Thus, tinting an image may affect the image's chrominance histogram only by a translation in histogram-space. This is a consequence of u and v being defined as they are herein—scaling an RGB channel is equivalent to shifting a log-chrominance channel. Luminance has no impact on this translation.

The equivalence between image-tinting and histogram-shifting facilitates white-balancing as described herein. Particularly, a white-balancing algorithm may operate by considering some or all possible tints of an image, scoring each tinted image, and then providing the highest-scoring tint (or rather, its inverse) as the estimated illumination chrominance of the input image. For instance, it would be desirable for the tint associated with the middle column chrominance histogram to have the highest score so that the white-balance algorithm tints the input image to be neutral.

Naively, doing this scoring may seem like an expensive proposition, as it requires a brute-force search over all possible tints, where some scoring function is applied at each tint. However, provided that the scoring function is a linear combination of histogram bins, this brute-force search is actually just the convolution of N with some filter F, and there are many ways that convolution operations can be made efficient.

Thus, at a high level, a white-balance algorithm can perform the following steps: (i) construct a chrominance histogram N from the input image I, (ii) convolve that histogram with some filter F, and (iii) use a high-scoring (e.g., the highest-scoring) illumination t to produce W=I/L. More formally:

$$(\hat{L}_u, \hat{L}_v) = \mathrm{argmax}_{u,v}(N*F) \qquad (17)$$

Where * is the convolution operator.

However, performing such a convolution and maximum search for a full-size chrominance histogram (e.g., a chrominance histogram as depicted in FIG. 1) may be prohibitively computationally expensive. For example, performing such an operation using the memory, processor, and processor speed available on a digital camera may prohibit such a white-balancing process from being performed in real-time for images generated at a certain rate (e.g., 30 Hertz) by the digital camera (e.g., to generate white-balanced images for a viewfinder display of the digital camera).

In order to reduce the computational cost and/or time required to perform the algorithms described herein, a smaller chrominance histogram could be determined. Such a chrominance histogram could represent a 'wrapped' version of a larger chrominance histogram, such that each element of the wrapped chrominance histogram represents the total number of pixels in an input image that have chrominances near any of a number of regularly spaced locations within a chrominance space. Such a reduced-size chrominance histogram, representing a 'wrapped' version of a larger, flat chrominance space, could be referred to as a toroidal chrominance histogram. This is because proximity within the toroidal chrominance histogram, with respect to the chrominance of pixels represented by elements of the toroidal chrominance histogram, wraps around opposite edges of the toroidal chrominance histogram. By way of example, a first element at a certain vertical location along the left edge of such a toroidal histogram is as proximate to a second element at the certain vertical location along the right edge of the chrominance histogram as to a third element that neighbors the first element along the left edge of the histogram.

Figure 2:
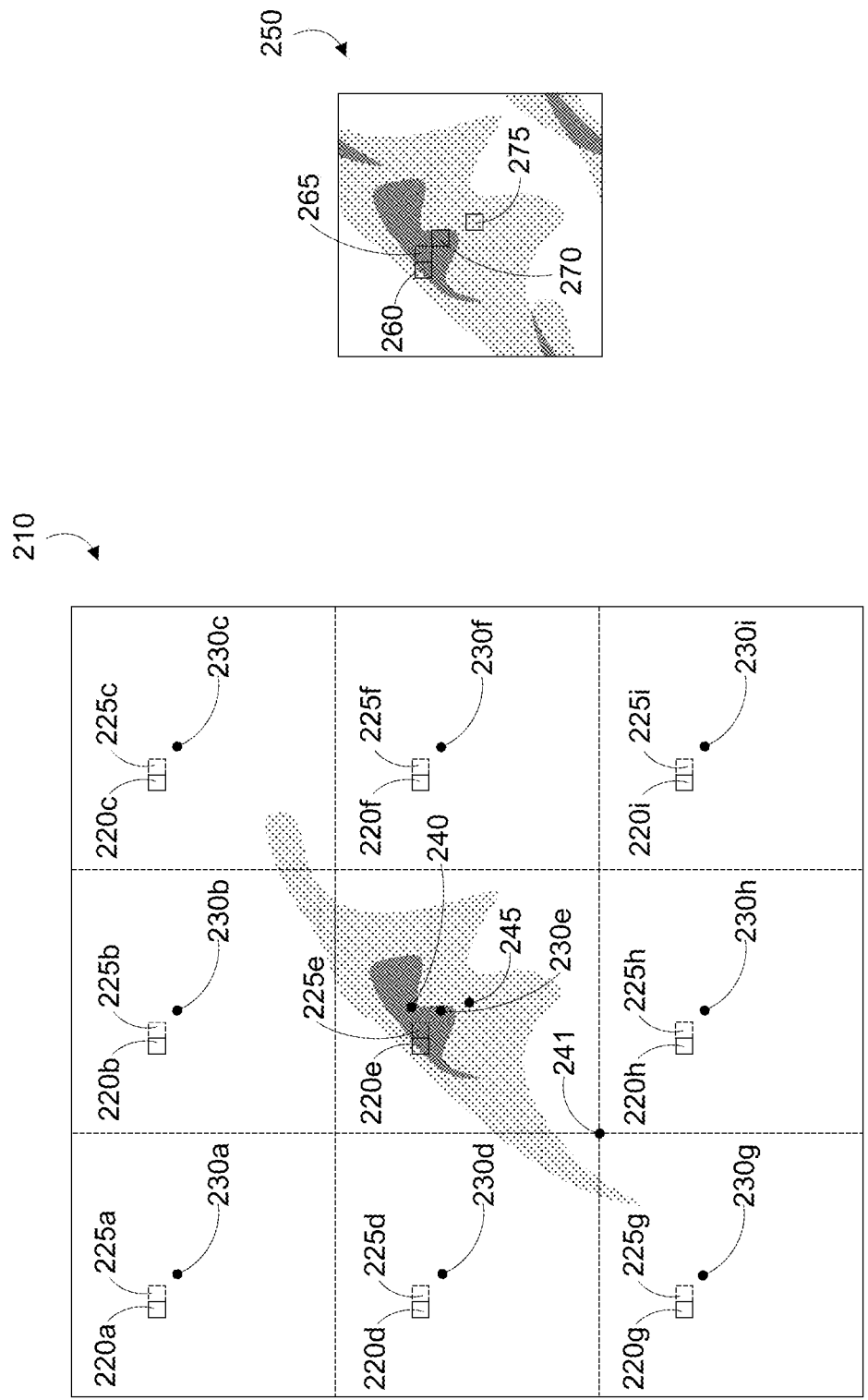
FIG. 2 depicts chrominance histograms according to example embodiments.

This is illustrated by way of example in FIG. 2. FIG. 2 illustrates an example chrominance histogram 210 in a flat chrominance space (e.g., a flat logarithmic chrominance space, similar to those shown in FIG. 1). The values of elements of the flat chrominance histogram 210 are shown by shading, with darker shading corresponding to higher histogram counts. The same image used to generate the flat chrominance histogram 210 could be used to determine a toroidal chrominance histogram. An example toroidal chrominance histogram 250, corresponding to the same input image as the flat chrominance histogram 210, is also shown in FIG. 2. The values of elements of the toroidal chrominance histogram 250 are shown by shading, with darker shading corresponding to higher histogram counts.

As the toroidal chrominance histogram 250 represents a wrapped version of the flat chrominance histogram 210, the area of the toroidal chrominance histogram 250 maps to multiple non-overlapping areas of the flat chrominance histogram 210. These areas are delineated in FIG. 2 by dashed horizontal and vertical lines. Accordingly, each location and/or element of the toroidal chrominance histogram 250 corresponds to a respective set of locations and/or elements of the flat chrominance histogram 210. For example, a first element 260 of the toroidal chrominance histogram 250 corresponds to a first set of regularly spaced elements 220*a-i* of the flat chrominance histogram 210. In another example, a second element 265 of the toroidal chrominance histogram 250 corresponds to a second set of regularly spaced elements 225*a-i* of the flat chrominance histogram 210. In yet another example, a particular location 270 within the toroidal chrominance space represented by the toroidal chrominance histogram 250 corresponds to a set of regularly spaced locations 230*a-i* within the flat chrominance space represented by the flat chrominance histogram 210.

Thus, each element (e.g., 260) of the toroidal chrominance histogram 250 corresponds to a number of pixels of an input image having chrominance values at a respective set of locations (e.g., 220*a-i*) within the chrominance space. Further, the set of locations within the chrominance space for a particular element of the toroidal chrominance histogram are regularly spaced within the chrominance space. Accordingly, in the toroidal histogram shown in FIG. 2, $N_T(u, v)$ indicates the number of pixels in input image I whose chrominance is near any one of a regularly spaced set of chrominances $\{u_{n,m}, v_{n,m}\}$. Formally:

$$N_T(u, v) = \qquad (18)$$
$$\sum_k \left( \mathrm{mod}\left( \frac{u^{(k)} - u_{io}}{h} - i, n \right) < 1 \wedge \mathrm{mod}\left( \frac{v^{(k)} - v_{io}}{h} - j, n \right) < 1 \right)$$

where the i,j are 0-indexed, n is the number of bins in the toroidal chrominance histogram (e.g., n=64), h is the bin size (e.g., h=1/32), and $(u_{lo}, v_{lo})$ is the starting point of the histogram (illustrated in FIG. 2 as example starting location 241). A chrominance histogram determined according to Equation (18), having regularly-spaced bins in a logarithmic chrominance space, may be referred to as a logarithmic chrominance histogram. The determined toroidal histogram $N_T$ could be normalized before any subsequent operations, e.g., by scaling the toroidal histogram to have a unit mass, by applying a softmax function, or by applying some other preprocessing.

The determined toroidal chrominance histogram $N_T$ can then be convolved with a filter F to generate a two-dimensional heat map that is related to a likelihood that a particular chrominance value is the chrominance of illumination present in an input image. Since the toroidal chrominance histogram 250 represents a wrapped histogram, such a convolution could be performed using Fast Fourier Transform techniques, e.g., to reduce a computational cost of the convolution and/or to increase a speed of the convolution. The illumination chrominance could then be determined based on the generated two-dimensional heat map, e.g., by determining a location of a maximum within the two-dimensional heat map. The estimated illumination chrominance could then be used according to a variety of applications, e.g., to generate a white balanced version of the input image, to generate an error signal (e.g., based on a difference between the estimated illumination chrominance and a known illumination chrominance for the input image) that could be used to update or otherwise train the filter F, or some other application.

However, since each location and/or element of the toroidal chrominance histogram 250 corresponds to a set of different locations within the flat chrominance histogram 210, and thus to a set of different potential illumination chrominances, a de-aliasing step must be performed. This is illustrated by way of example by:

$$\mu \leftarrow f(N_T * F) \qquad (19)$$

$$\begin{bmatrix} \hat{L}_u \\ \hat{L}_v \end{bmatrix} \leftarrow \mathrm{de\_alias}(\mu) \qquad (20)$$

where $f$ is a function to determine a chrominance location based on the two-dimensional heat map, $\mu$ is a chrominance location within the toroidal chrominance histogram estimated based on the two-dimensional heat map $N_T*F$, de_alias is a function to determine an illumination chrominance based on an input chrominance location $\mu$ (e.g., by selecting an output illumination chrominance from a set of chrominances associated with p), and $\hat{L}_u$, $\hat{L}_v$ are the determined values of the output illumination chrominance. A determined location within a toroidal chrominance space can be de-aliased to a respective location within a flat chrominance space (e.g., to a predicted illumination chrominance) in a variety of ways. The function $f$ could include a normalizing function, a softmax function, or some other preprocessing function or algorithm prior to determining a chrominance location.

In some examples, determining the illumination chrominance for an input image could include: (i) selecting a particular element of a toroidal chrominance histogram 250 determined from the input image; (ii) selecting, from the set of locations within the chrominance space that correspond to the selected element of the toroidal chrominance histogram 250, a location within the chrominance space; and (iii) determining the illumination chrominance for the input image based on the selected location within the chrominance space. This is illustrated in FIG. 2 by example element 270 of the toroidal chrominance histogram 250. The example element 270 corresponds to a set of locations 230*a-i* within the chrominance space of the flat chrominance histogram 210. A particular one of the set of locations 230*a-i* could be selected via a variety of methods.

That particular location could be selected from the set based on proximity to an average chrominance of the input image (e.g., an average log-chroma value of the input image). For example, the particular location could be selected, from the set of locations 230*a-i* within the chrominance space that corresponds to the selected element 270 of the toroidal chrominance histogram 250, a location within the chrominance space that is most similar to the mean chrominance of the input image. Such a determination could be based on an assumption that the average color of the scene represented by the input image is neutral (a so-called "grey world" de-aliasing technique). Additionally or alternatively, the particular one of the set of locations 230*a-i* could be selected based on some other consideration or information, e.g., based on proximity to a determined illumination chrominance for an additional input image that is proximate in time to the input image for which the illumination chrominance is being determined (e.g., based on an assumption that the illumination chrominance for a scene is less likely to change abruptly over short periods of time).

In some examples, the correspondence between elements of the toroidal chrominance histogram 250 and locations of the chrominance space could be specified such that the center of the toroidal chrominance histogram 250 corresponds to an expected illumination chrominance (a so-called "grey-light" de-aliasing technique). In such examples, a central element of the toroidal chrominance histogram (e.g., 275) is located within a central region of the toroidal chrominance histogram 250. The correspondence between the elements of the toroidal chrominance histogram 250 and locations in the flat chrominance space is specified (e.g., by setting values for $u_{lo}$ and $v_{lo}$) such that a particular one (e.g., 245) of the set of locations within the chrominance space corresponding to that central element 275 of the toroidal chrominance histogram 250 corresponds to an expected illumination chrominance 245 (e.g., a chrominance location (u,v) of white light).

A variety of methods could be employed to determine, based on a two-dimensional heat map as described above, an estimated illumination chrominance (which, itself, may be de-aliased as described above). For example, an element could be selected from the two-dimensional heat map that has a maximum value within the heat map, or that has a value within a threshold of such a maximum value. Additionally or alternatively, a probability distribution or some other circular statistic could be fitted to the two-dimensional heat map and one or more parameters (e.g., a mean chrominance) of such a fitted distribution or statistic could be used to estimate an illumination chrominance. Such a probability distribution or statistic could be specified relative to the wrapped, toroidal nature of the chrominance space represented by the toroidal chrominance map 250.

For example, a circular mean could be determined, based on such a two-dimensional heat map, and used to determine an estimated illumination chrominance (e.g., by applying the circular mean to a de-aliasing method and/or some other function). A circular mean is a statistic used to determine the 'average' for variables (e.g., variables having a circular distribution) which are defined on a circular or otherwise looped space (e.g., a toroidal space). Such a circular mean takes into account the fact that values near one 'edge' of a circular space are proximate to values near the opposite 'edge' of the circular space, owing to the looped topology of the circular space. Thus, a circular mean of a set of values that are located near one or the other edge of a circular space is a value near one of the edges of the circular space, while an arithmetic mean of the set of values is likely to be some intermediate value that does not accurately reflect the location, within the circular space, of the mass of the set of values.

Additionally, a covariance of the two-dimensional heat map about such a circular mean could be determined and used to provide some benefit. For example such a covariance could be used to determine a weighted combination of the determined circular mean and a determined illumination chrominance for a prior input image (e.g., to facilitate a temporally-smoothed sequence of estimated illumination chrominances for a video stream). In a particular example, the determined circular mean and covariance could correspond to the mean and covariance of a bivariate von Mises distribution.

This is illustrated by way of example by:

$$P \leftarrow f(N_T * F) \quad (21)$$

$$(\mu, \Sigma) \leftarrow \text{fit\_bvm}(P) \quad (22)$$

$$\begin{bmatrix} \hat{L}_u \\ \hat{L}_v \end{bmatrix} \leftarrow \text{de\_alias}(\mu) \quad (23)$$

where $f$ is a pre-processing function to determine a two-dimensional heat map P based on a convolution of a toroidal chrominance histogram $N_T$ and a filter F, $\mu$ is a circular mean of P, $\Sigma$ is a covariance of P, fit_bvm is a function that fits a bivariate von Mises distribution to a two-dimensional heat map P, de_alias is a function to determine an illumination chrominance based on an circular mean $\mu$ (e.g., by selecting an output illumination chrominance from a set of chrominances associated with $\mu$), and $\hat{L}_u$, $\hat{L}_v$ are the determined values of the output illumination chrominance. The function $f$ could include a normalizing function, a softmax function, or some other preprocessing function or algorithm prior to determining a chrominance location. For example, $f$ could be a softmax function of the form:

$$P(u, v) = \frac{\exp((N_T * F)(u, v))}{\sum_{u',v'} \exp((N_T * F)(u', v'))} \quad (24)$$

Figure 3:
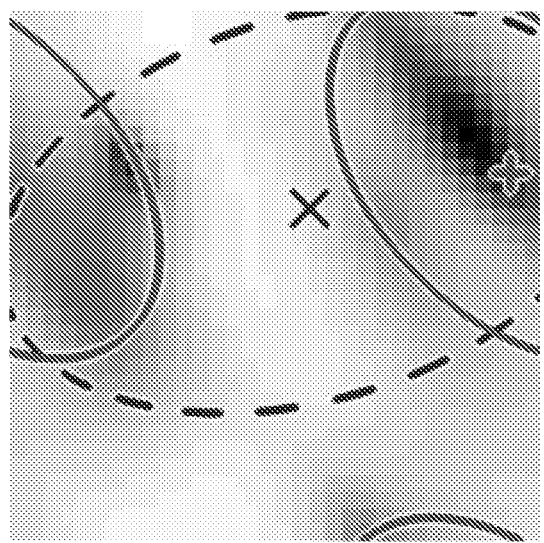
FIG. 3 depicts statistical fits onto example heat maps according to example embodiments.
Figure 3:
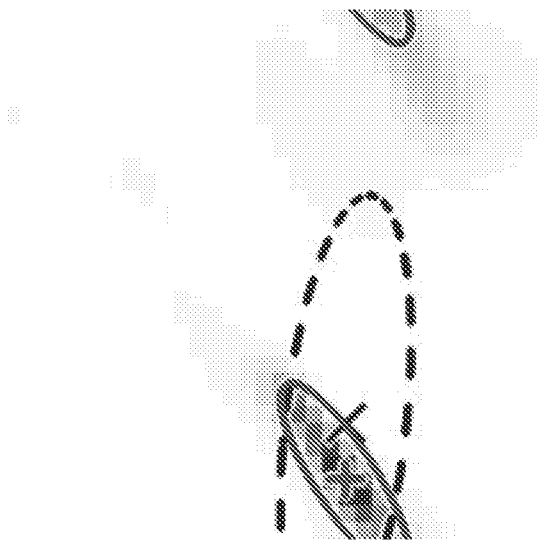
Figure 3:
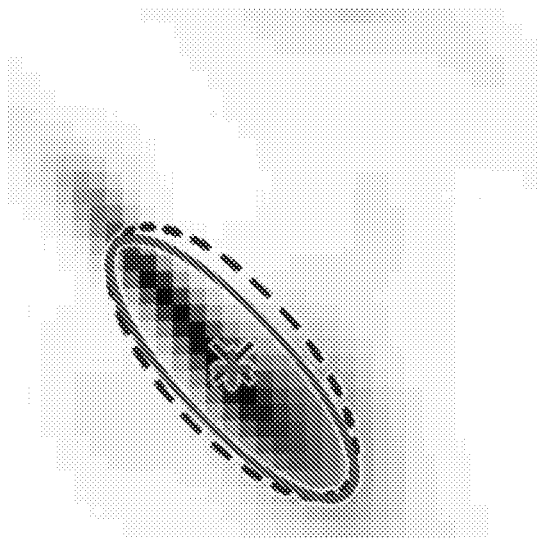

The use of a von Mises distribution to determine, based on a two-dimensional heat map as described herein, an estimated illumination chrominance may provide a variety of benefits. The bivariate von Mises distribution, being defined for a toroidal space, is suited to the toroidal chrominance space represented by the toroidal chrominance histogram 250. This is illustrated in FIG. 3, which contains three example two-dimensional heat maps. For each of the heat maps, a 'naïve' mean and covariance are illustrated by an "x" and a dashed-line ellipse, respectively. The 'naïve' mean and covariance are determined by simply determining a two-dimensional mean and covariance of the heat maps without regard for the fact that the underlying space represented by the heat map is toroidal and thus wraps around the edges of the heat maps. In contrast, the circular mean (shown by "+" symbols) and covariance (shown by solid-line ellipses) determined, according to the von Mises distribution, for each of the heat maps, take into account the toroidal, wrapped nature of the two-dimensional heat maps. As a result, the circular mean and covariance more accurately reflect the structure within the heat maps when compared to the naïvely determined means and covariances, especially when the 'center' of a heat map is near the edge of the heat map (e.g., as shown in the center and right example heat maps of FIG. 3).

Determining a bivariate von Mises distribution (or other appropriate circular probability distribution) for a two-dimensional heat map as described herein could also provide benefits related to temporal smoothing of sequences of estimated illumination chrominances (e.g., for sequences of input images of a video stream) and/or related to training of filters or other algorithm parameters (e.g., by providing a complete posterior distribution over the heat map). In some examples, a first illumination chrominance could be determined for a first input image using the methods described herein. A second illumination chrominance could then be determined for a second input image based on the first illumination chrominance and a two-dimensional heat map determined, using the method herein, based on the second input image. A von Mises (or other circular, two-dimensional probability distribution) determined for the second-image heat map could inform the combination of the first illumination chrominance and the second-image heat map to generate the second illumination chrominance. For example, the second-image illumination chrominance could be determined according to a directed, weighted combination of the first-image illumination chrominance and a circular mean or other statistic determined for the second-image hat map.

The filter F could be trained or otherwise determined based on a set of example images and known illumination chrominances thereof. Regardless of the method of determination, the filter F reflects the distribution of colors in white-balanced scenes. Further, F is independent of the tints of the training images as a result of the shift-invariance of the toroidal chrominance histograms combined with F being evaluated as a convolution. Accordingly, a learned filter F is not limited to a particular image sensor or image capture device, and may be applied to determine illumination chrominances for images captured using a variety of image sensors or image capture apparatus, without requiring any special calibration or registration processes.

Training of the filter F may include using the methods described herein to determine, for a plurality of training images in a training set, respective estimated illumination chrominances. The estimated illumination chrominances could then be compared to respective known illumination chrominances for the images in the training set and those differences could be used to update the filter, e.g., according to a gradient descent method or other machine learning algorithm. Such determined losses could be backpropagated through the elements of the methods described herein to facilitate such training of the filter (that is, each of the functions, algorithms, or other steps described herein could be analytically differentiable).

In some examples, such differences could be translated, using a loss function, into a loss value that could be used to update the filter (e.g., via backpropagation). Such a loss function could take into account the overall shape or distribution of patterns within a two-dimensional heat map (e.g., a von Mises distribution). For example, the loss for a particular filter and input training image could be related to a negative log-likelihood of a Gaussian relative to the true illumination chrominance for the input training image according $$\log|\Sigma| + \left(\begin{bmatrix} L_u^* \\ L_v^* \end{bmatrix} - \mu\right)^T \Sigma^{-1} \left(\begin{bmatrix} L_u^* \\ L_v^* \end{bmatrix} - \mu\right) \quad (25)$$

where $L_u^*$ and $L_u^*$ are the chrominance of the true illuminant for the training input image and $\mu$ and $\Sigma$ are the circular mean and covariance, respectively, of a two-dimensional heat map determined for the input training image (e.g., corresponding to a bivariate von Mises distribution fitted to the heat map). Such a loss function could be augmented by additional terms, e.g., to reduce a norm of the coefficients of the filter F.

Filters trained according to such a method could then be used to estimate illumination chrominances for additional images, e.g., for images captured by a cell phone. In some examples, this could include a server or other system transmitting an indication of the trained filter (e.g., transmitting application data that includes the trained filter) to another system that may capture the additional images (e.g., a cellphone, a digital camera). Such transmission could include wireless or wired transmissions to devices in operation (e.g., via a cellular data network). Additionally or alternatively, such transmission could include providing the trained filter to a device during manufacture of such a device (e.g., during programming of such a device and/or programming of a memory or other component thereof).

III. EXAMPLE EXTENSIONS TO THE WHITE-BALANCING METHOD

The methods described above may be extended in a variety of ways to improve the accuracy or other properties of illumination chrominances estimated thereby or to provide some other benefits. For example, the function used to determine and/or preprocess a two-dimensional heat map based on the convolution of a filter and a toroidal chrominance histogram could be augmented by a bias map and/or a gain map. Such augmentation could be provided to allow the algorithm to weight different estimated illumination chrominances differently (e.g., based on expectations about natural illuminants), to anchor the model with respect to a particular chrominance space (e.g., to compensate for the chrominance shift-invariant nature of the toroidal chrominance histogram), or to provide some other benefit. Additionally or alternatively, augmented images could be determined based on an input image (e.g., to emphasize edges or other features in the input image) and those augmented images could be used, in combination with the input image, to estimate an illumination chrominance for the input image. In some embodiments, temporal smoothing could be used to improve illumination chrominance estimates for an image (e.g., an image of a video stream) by using information (e.g., an estimated illumination chrominance) from a temporally prior image (e.g., a prior frame of a video stream).

By way of illustration, an algorithm may, instead of constructing and classifying a single toroidal histogram $N_T$ from a single image I, a set of histograms $\{N_C\}$ from a set of "augmented" images $\{I_C\}$ (which may include the original input image) may be combined and/or filtered (e.g., by applying respective filters $F_C$) to generate a two-dimensional heat map (which may then be used to determine an illumination chrominance for the input image). These augmented images may reflect edge and spatial statistics of the input image I, thereby enabling the model to combine multiple sources of chrominance information in additional to individual pixel chrominance.

One might construct these augmented images $\{I_C\}$ by simply applying common image processing operations to I, such as applying a filter bank, median filters, morphological operations, etc. But, the image from which chrominance histograms are constructed should map color-scaling to the channels of the input image to shifts in chrominance histogram space. This means that the augmented images should preserve this property, and map a per-channel scaling to the same shift in histogram space. Thus, there may be a limited set of possible augmented images that for use.

It can be shown that, for the color-scaling/histogram-shifting property to be met, the mapping should preserve scalar multiplication—a scaled-then-filtered version of a channel in the input image I should be equal to a filtered-then-scaled version of that channel. Additionally, the output of the mapping should be non-negative as the logarithm of these values may be taken. Further, it is advantageous to select augmentations that are computationally inexpensive to perform, as the methods described herein may be performed on devices with limited computational resources (e.g., digital cameras).

An example augmentation is to determine, for each pixel in the input image, a local measure of absolute deviation in the input image. This is illustrated by the following formula:

$$E(x, y, c) = \frac{1}{8} \sum_{i=-1}^{1} \sum_{j=-1}^{1} |I(x, y, c) - I(x+i, y+j, c)| \quad (26)$$

where x and y are pixel indices in the input image I and augmented image E and c is a color channel index. An additional toroidal chrominance histogram can then be determined based on the augmented image and convolved with a filter to generate an augmented two-dimensional heat map. This augmented two-dimensional heat map could then be used in combination with a two-dimensional heat map determined from the toroidal chrominance histogram for the input image to determine an illumination chrominance for the input image. The filter convolved with the augmented-image toroidal chrominance histogram could be learned via methods similar to those described.

The methods described above include determining illumination chrominances based on toroidal chrominance histograms. As noted above, such toroidal histograms are invariant with respect to shifts within the toroidal space of the toroidal chrominance histogram. Accordingly, filters learned for such histograms may lack the ability to represent information about expected illuminants directly. To provide the methods herein with the ability to represent such inferences, the methods could be augmented with gain and/or bias maps (which could be trained as described elsewhere herein for toroidal chrominance histogram filters). Such gain and/or bias maps could be applied to the convolution of filters with toroidal chrominance histograms prior to normalizations, von Mises distribution fitting, or other processes used to determine illumination chrominances from such toroidal chrominance histograms.

This is illustrated by way of example by:

$$P = f\left(B + G \cdot \sum_c (N_c * F_c)\right) \quad (27)$$

where $N_C$ are toroidal chrominance histograms (e.g., two histograms determined from the pixels of an input image and an augmented version of the input image, respectively). $F_C$ are filters applied to the toroidal chrominance histograms, B is a bias map, G is a gain map applied to the sum of the convolutions of the filters and toroidal histograms, an $f$ is a function (e.g., softmax function) applied to generate an output map P. The output map P that can then be used to determine an illumination chrominance for the input image (e.g., by fitting a bivariate von Mises distribution to P and de-aliasing a circular mean thereof), to determine a difference between such an estimated illumination chrominance and a known 'true' illumination chrominance for the input image (e.g., to determine a loss function value that could be used to update one or more of the B, G, or $N_C$), or to provide some other benefit.

The bias map B, being applied additively, may represent a 'preference' for particular illumination chrominances (e.g., due to those chrominances being particularly represented in a set of training images). The gain map G, being applied multiplicatively to the summed elements of the filter-histogram convolutions, may represent an amplification bias toward certain chrominances, when those chrominances are implicated by the convolution of the filter(s) with the toroidal chrominance histogram(s). The bias map B, gain map G, and filters $F_C$ may be trained as described above for histogram filter F. For example, these elements may be used, based on a training image, to determine an estimated illumination chrominance for the training image. A loss function could then be applied, based on the estimated illumination chrominance and a known 'true' illumination chrominance for the training image, to determine a loss value for the bias map B, gain map C, and filters F (e.g., in combination with parameters of a von Mises distribution fitted to the output of the algorithm applied using B, G, and the $F_C$). The determined loss value could then be used to update the B, G, and $F_C$ (e.g., via an iterative process that employs, e.g., backpropagation).

Figure 4:
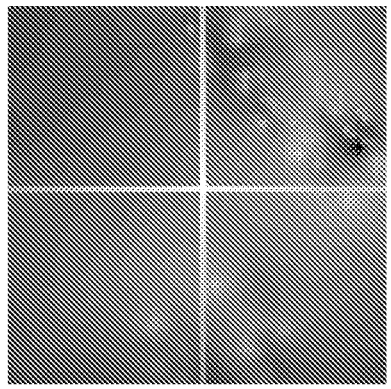
FIG. 4 depicts filters determined using training image sets according to example embodiments.
Figure 4:
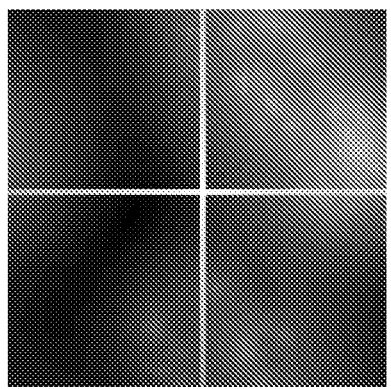
Figure 4:
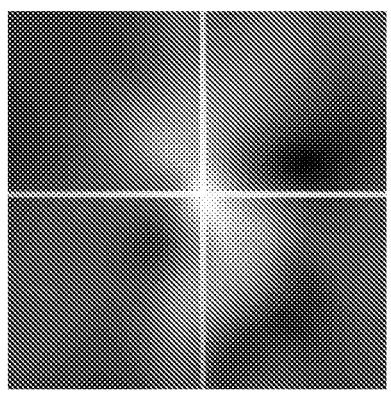
Figure 4:
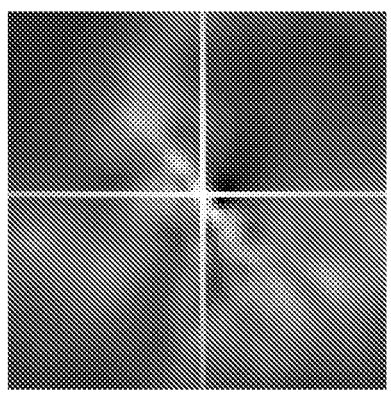

FIG. 4 depicts visualizations of filters and maps trained, based on a set of training images and corresponding "ground truth" illumination chrominances, as described above. The leftmost filter 410 is applied, by convolution, to toroidal chrominance histograms determined from the pixels of an input image. The left-center filter 420 is applied, by convolution, to toroidal chrominance histograms determined from the pixels of an augmented image determined according to Equation (26) above. The right-center map 430 is a gain map G as described above and the rightmost map 440 is a bias map B as described above.

In some examples, the methods described herein could be modified to permit temporal smoothing of illumination chrominances determined for temporally proximate input images (e.g., frames of a video or video stream). For example, an estimated illumination chrominance, or statistics related thereto (e.g., a determined circular mean, covariance, or other statistics determined from a two-dimensional heat map) for a particular input image could be used to update a running estimate of such parameters for a video stream. In an illustrative embodiment, a running estimate of a mean and covariance for the chrominance of illumination in a scene represented by a video stream could be determined for a first set of images of the video stream. When an additional image of the video stream is obtained (e.g., captured by an image sensor of a digital camera), a mean and covariance for the chrominance of illumination present in the additional image could be determined. The mean and covariance determined from the additional image could then be used to update the running estimate of the mean and covariance of the illumination chrominance for the video stream.

This is illustrated by:

$$\sum_{t+1} = \left(\left(\sum_t + \begin{bmatrix} \alpha & 0 \\ 0 & \alpha \end{bmatrix}\right)^{-1} + \sum_0\right)^{-1} \quad (28)$$

$$\mu_{t+1} = \sum_{t+1}\left(\left(\sum_t + \begin{bmatrix} \alpha & 0 \\ 0 & \alpha \end{bmatrix}\right)^{-1}\mu_t + \sum_0 \mu_0\right)^{-1} \quad (29)$$

where $\Sigma_t$ and $\mu_t$ are the running estimates of the mean and covariance, respectively, of the illumination chrominance prior to update, $\Sigma_0$ and $\mu_0$ are the estimates of the mean and covariance, respectively, determined from the additional input image, $\Sigma_{t+1}$ and $\mu_{t+1}$ are the running estimates of the mean and covariance, respectively, of the illumination chrominance following the update, and $\alpha$ is a parameter that defines the expected variance of the illumination chrominance over time.

IV. EXAMPLE SYSTEMS AND IMAGE CAPTURE DEVICES

As image capture devices, such as cameras, become more popular, they may be employed as standalone hardware devices or integrated into various other types of devices. For instance, still and video cameras are now regularly included in wireless computing devices (e.g., mobile phones), tablet computers, laptop computers, video game interfaces, home automation devices, and even automobiles and other types of vehicles.

The physical components of a camera may include one or more apertures through which light enters, one or more recording surfaces for capturing the images represented by the light, and lenses positioned in front of each aperture to focus at least part of the image on the recording surface(s). The apertures may be fixed size or adjustable. In an analog camera, the recording surface may be photographic film. In a digital camera, the recording surface may include an electronic image sensor (e.g., a charge coupled device (CCD) or a complementary metal-oxide-semiconductor (CMOS) sensor) to transfer and/or store captured images in a data storage unit (e.g., memory).

One or more shutters may be coupled to or nearby the lenses or the recording surfaces. Each shutter may either be in a closed position, in which it blocks light from reaching the recording surface, or an open position, in which light is allowed to reach to recording surface. The position of each shutter may be controlled by a shutter button. For instance, a shutter may be in the closed position by default. When the shutter button is triggered (e.g., pressed), the shutter may change from the closed position to the open position for a period of time, known as the shutter cycle. During the shutter cycle, an image may be captured on the recording surface. At the end of the shutter cycle, the shutter may change back to the closed position.

Alternatively, the shuttering process may be electronic. For example, before an electronic shutter of a CCD image sensor is "opened," the sensor may be reset to remove any residual signal in its photodiodes. While the electronic shutter remains open, the photodiodes may accumulate charge. When or after the shutter closes, these charges may be transferred to longer-term data storage. Combinations of mechanical and electronic shuttering may also be possible.

Regardless of type, a shutter may be activated and/or controlled by something other than a shutter button. For instance, the shutter may be activated by a softkey, a timer, or some other trigger. Herein, the term "image capture" may refer to any mechanical and/or electronic shuttering process that results in one or more images being recorded, regardless of how the shuttering process is triggered or controlled.

The exposure of a captured image may be determined by a combination of the size of the aperture, the brightness of the light entering the aperture, and the length of the shutter cycle (also referred to as the shutter length or the exposure length). Additionally, a digital and/or analog gain may be applied to the image, thereby influencing the exposure. In some embodiments, the term "total exposure length" or "total exposure time" may refer to the shutter length multiplied by the gain for a particular aperture size. Herein, the term "total exposure time," or "TET," should be interpreted as possibly being a shutter length, an exposure time, or any other metric that controls the amount of signal response that results from light reaching the recording surface.

A still camera may capture one or more images each time image capture is triggered. A video camera may continuously capture images at a particular rate (e.g., 24 images—or frames—per second) as long as image capture remains triggered (e.g., while the shutter button is held down). Some digital still cameras may open the shutter when the camera device or application is activated, and the shutter may remain in this position until the camera device or application is deactivated. While the shutter is open, the camera device or application may capture and display a representation of a scene on a viewfinder. When image capture is triggered, one or more distinct digital images of the current scene may be captured.

Cameras—even analog cameras—may include software to control one or more camera functions and/or settings, such as aperture size, TET, gain, and so on. Additionally, some cameras may include software that digitally processes images during or after these images are captured. While the description above refers to cameras in general, it may be particularly relevant to digital cameras.

Figure 5:
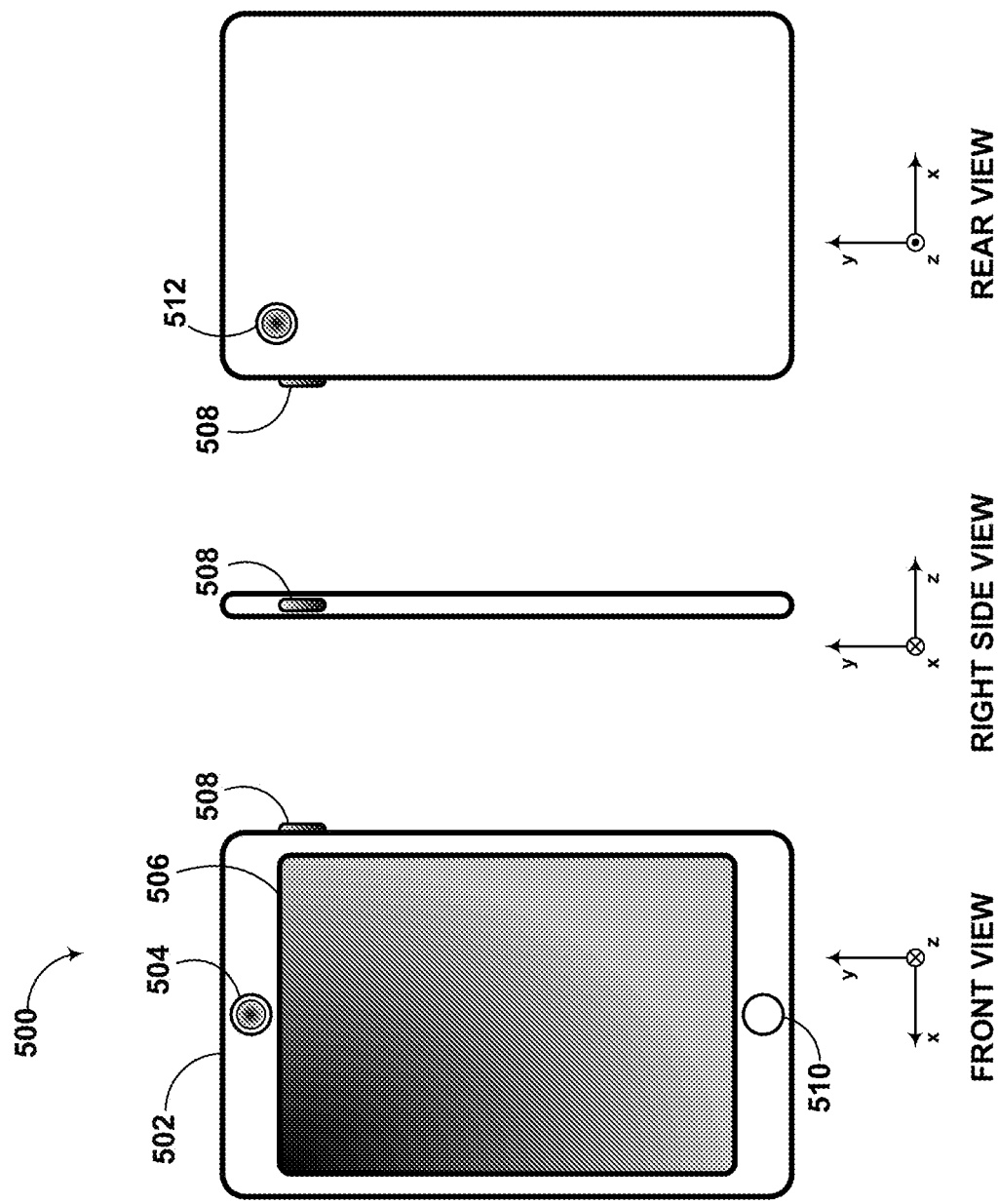
FIG. 5 depicts front, right side, and rear views of a digital camera device, according to example embodiments.

As noted previously, digital cameras may be standalone devices or integrated with other devices. As an example, FIG. 5 illustrates the form factor of a digital camera device 500. Digital camera device 500 may be, for example, a mobile phone, a tablet computer, or a wearable computing device. However, other embodiments are possible. Digital camera device 500 may include various elements, such as a body 502, a front-facing camera 504, a multi-element display 506, a shutter button 508, and other buttons 510. Digital camera device 500 could further include a rear-facing camera 512. Front-facing camera 504 may be positioned on a side of body 502 typically facing a user while in operation, or on the same side as multi-element display 506. Rear-facing camera 512 may be positioned on a side of body 502 opposite front-facing camera 504. Referring to the cameras as front and rear facing is arbitrary, and digital camera device 500 may include multiple cameras positioned on various sides of body 502.

Multi-element display 506 could represent a cathode ray tube (CRT) display, a light emitting diode (LED) display, a liquid crystal (LCD) display, a plasma display, or any other type of display known in the art. In some embodiments, multi-element display 506 may display a digital representation of the current image being captured by front-facing camera 504 and/or rear-facing camera 512, or an image that could be captured or was recently captured by either or both of these cameras. Thus, multi-element display 506 may serve as a viewfinder for either camera. Multi-element display 506 may also support touchscreen and/or presence-sensitive functions that may be able to adjust the settings and/or configuration of any aspect of digital camera device 500.

Front-facing camera 504 may include an image sensor and associated optical elements such as lenses. Front-facing camera 504 may offer zoom capabilities or could have a fixed focal length. In other embodiments, interchangeable lenses could be used with front-facing camera 504. Front-facing camera 504 may have a variable mechanical aperture and a mechanical and/or electronic shutter. Front-facing camera 504 also could be configured to capture still images, video images, or both. Further, front-facing camera 504 could represent a monoscopic, stereoscopic, or multiscopic camera. Rear-facing camera 512 may be similarly or differently arranged. Additionally, front-facing camera 504, rear-facing camera 512, or both, may be an array of one or more cameras.

Either or both of front facing camera 504 and rear-facing camera 512 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

Either or both of front facing camera 504 and rear-facing camera 512 may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. Additionally, the ambient light sensor's input may be used to determine a TET of an associated camera, or to help in this determination.

Digital camera device 500 could be configured to use multi-element display 506 and either front-facing camera 504 or rear-facing camera 512 to capture images of a target object. The captured images could be a plurality of still images or a video stream. The image capture could be triggered by activating shutter button 508, pressing a softkey on multi-element display 506, or by some other mechanism. Depending upon the implementation, the images could be captured automatically at a specific time interval, for example, upon pressing shutter button 508, upon appropriate lighting conditions of the target object, upon moving digital camera device 500 a predetermined distance, or according to a predetermined capture schedule.

Figure 6:
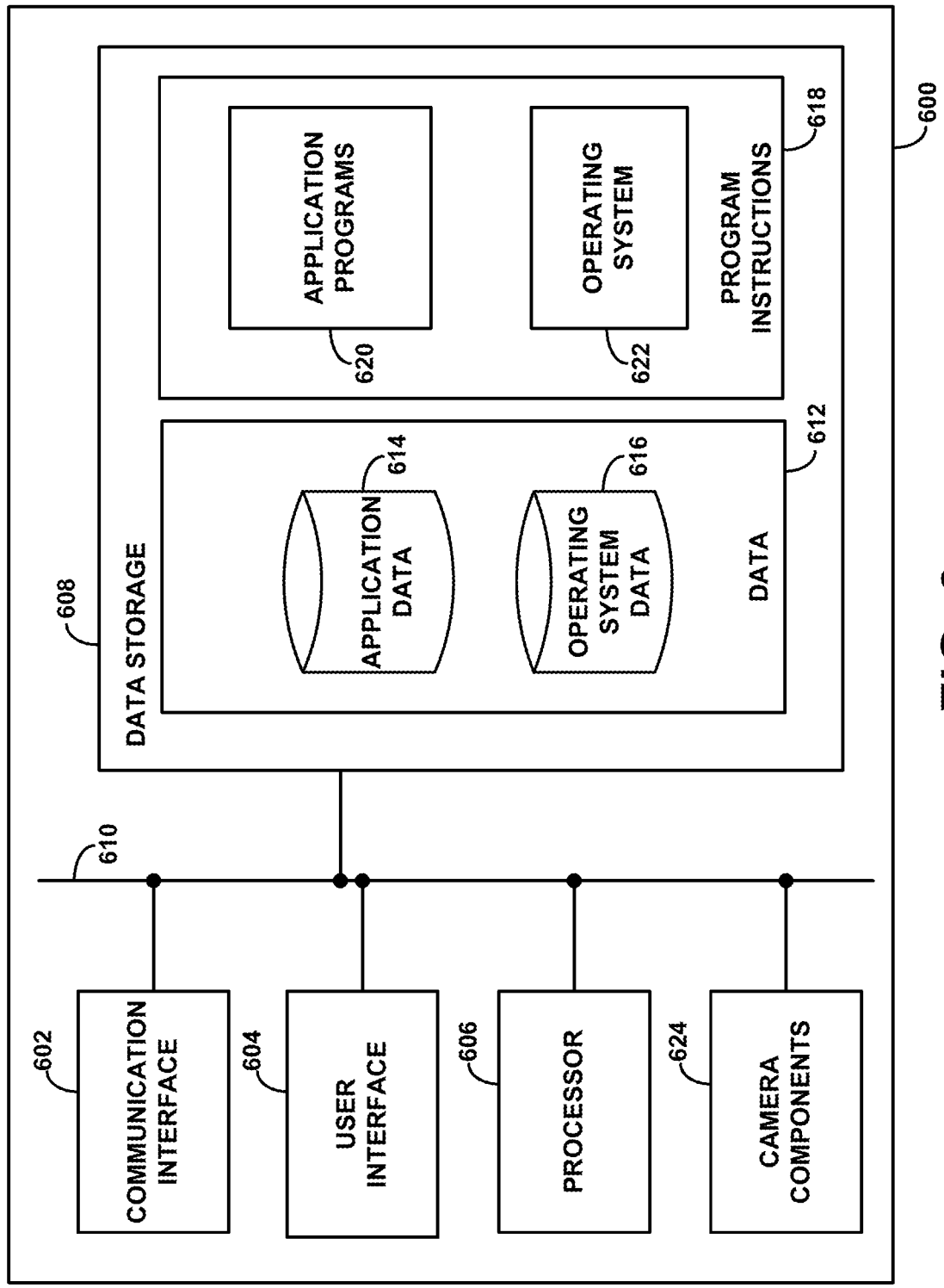
FIG. 6 depicts a block diagram of a computing device with image capture capability, according to example embodiments.

As noted above, the functions of digital camera device 500—or another type of digital camera—may be integrated into a computing device, such as a wireless computing device, cell phone, tablet computer, laptop computer and so on. For purposes of example, FIG. 6 is a simplified block diagram showing some of the components of an example computing device 600 that may be configured and/or operated to capture images and/or to perform one or more of the methods described herein. As shown in FIG. 6, computing device 600 may include camera components 624. Alternatively, computing device 600 could lack image acquisition components and could be configured to provide some other benefit, e.g., to perform one or more of the methods described elsewhere herein.

By way of example and without limitation, computing device 600 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, or some other type of device equipped with at least some image capture and/or image processing capabilities. It should be understood that computing device 600 may represent a physical camera device such as a digital camera, a particular physical hardware platform on which a camera application operates in software, or other combinations of hardware and software that are configured to carry out camera functions. In some examples, the computing device 600 may be a server, a cloud computing system, or some other system or device that lacks camera components and that is configured to perform some operations as described herein.

As shown in FIG. 6, computing device 600 may include a communication interface 602, a user interface 604, a processor 606, data storage 608, and camera components 624, all of which may be communicatively linked together by a system bus, network, or other connection mechanism 610.

Communication interface 602 may allow computing device 600 to communicate, using analog or digital modulation, with other devices, access networks, and/or transport networks. Thus, communication interface 602 may facilitate circuit-switched and/or packet-switched communication, such as plain old telephone service (POTS) communication and/or Internet protocol (IP) or other packetized communication. For instance, communication interface 602 may include a chipset and antenna arranged for wireless communication with a radio access network or an access point. Also, communication interface 602 may take the form of or include a wireline interface, such as an Ethernet, Universal Serial Bus (USB), or High-Definition Multimedia Interface (HDMI) port. Communication interface 602 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 602. Furthermore, communication interface 602 may comprise multiple physical communication interfaces (e.g., a Wifi interface, a BLUETOOTH® interface, and a wide-area wireless interface).

User interface 604 may function to allow computing device 600 to interact with a human or non-human user, such as to receive input from a user and to provide output to the user. Thus, user interface 604 may include input components such as a keypad, keyboard, touch-sensitive or presence-sensitive panel, computer mouse, trackball, joystick, microphone, and so on. User interface 604 may also include one or more output components such as a display screen which, for example, may be combined with a presence-sensitive panel. The display screen may be based on CRT, LCD, and/or LED technologies, or other technologies now known or later developed. User interface 604 may also be configured to generate audible output(s), via a speaker, speaker jack, audio output port, audio output device, earphones, and/or other similar devices.

In some embodiments, user interface 604 may include a display that serves as a viewfinder for still camera and/or video camera functions supported by computing device 600. Additionally, user interface 604 may include one or more buttons, switches, knobs, and/or dials that facilitate the configuration and focusing of a camera function and the capturing of images (e.g., capturing a picture). It may be possible that some or all of these buttons, switches, knobs, and/or dials are implemented by way of a presence-sensitive panel.

Processor 606 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, white balancing, tinting images, margining images, and generating chroma histograms or other information related to the methods described herein, among other possibilities. Data storage 608 may include one or more volatile and/or non-volatile storage components, such as magnetic, optical, flash, or organic storage, and may be integrated in whole or in part with processor 606. Data storage 608 may include removable and/or non-removable components.

Processor 606 may be capable of executing program instructions 618 (e.g., compiled or non-compiled program logic and/or machine code) stored in data storage 608 to carry out the various functions described herein. Therefore, data storage 608 may include a non-transitory computer-readable medium, having stored thereon program instructions that, upon execution by computing device 600, cause computing device 600 to carry out any of the methods, processes, or operations disclosed in this specification and/or the accompanying drawings. The execution of program instructions 618 by processor 606 may result in processor 606 using data 612.

By way of example, program instructions 618 may include an operating system 622 (e.g., an operating system kernel, device driver(s), and/or other modules) and one or more application programs 620 (e.g., camera functions, address book, email, web browsing, social networking, and/or gaming applications) installed on computing device 600. Similarly, data 612 may include operating system data 616 and application data 614. Operating system data 616 may be accessible primarily to operating system 622, and application data 614 may be accessible primarily to one or more of application programs 620. Application data 614 may be arranged in a file system that is visible to or hidden from a user of computing device 600.

Application programs 620 may communicate with operating system 622 through one or more application programming interfaces (APIs). These APIs may facilitate, for instance, application programs 620 reading and/or writing application data 614, transmitting or receiving information via communication interface 602, receiving and/or displaying information on user interface 604, and so on. In some examples, one or more of the application programs 620 could use the methods described herein to estimate illumination chrominances for images, to tint such images based on such estimated illumination chrominances, to perform such tinting or other operations for video streams (e.g., to white-balance a video stream provided on a screen or through a viewfinder during video capture), or to perform some other operations as described herein. In such examples, the application data 614 could include filters or other information used to perform one or more of the methods described herein.

In some vernaculars, application programs 620 may be referred to as "apps" for short. Additionally, application programs 620 may be downloadable to computing device 600 through one or more online application stores or application markets. However, application programs can also be installed on computing device 600 in other ways, such as via a web browser or through a physical interface (e.g., a USB port) on computing device 600.

Camera components 624 may include, but are not limited to, an aperture, shutter, recording surface (e.g., photographic film and/or an image sensor), lens, and/or shutter button. Camera components 624 may be controlled at least in part by software executed by processor 606.

V. EXAMPLE OPERATIONS

Figure 7:
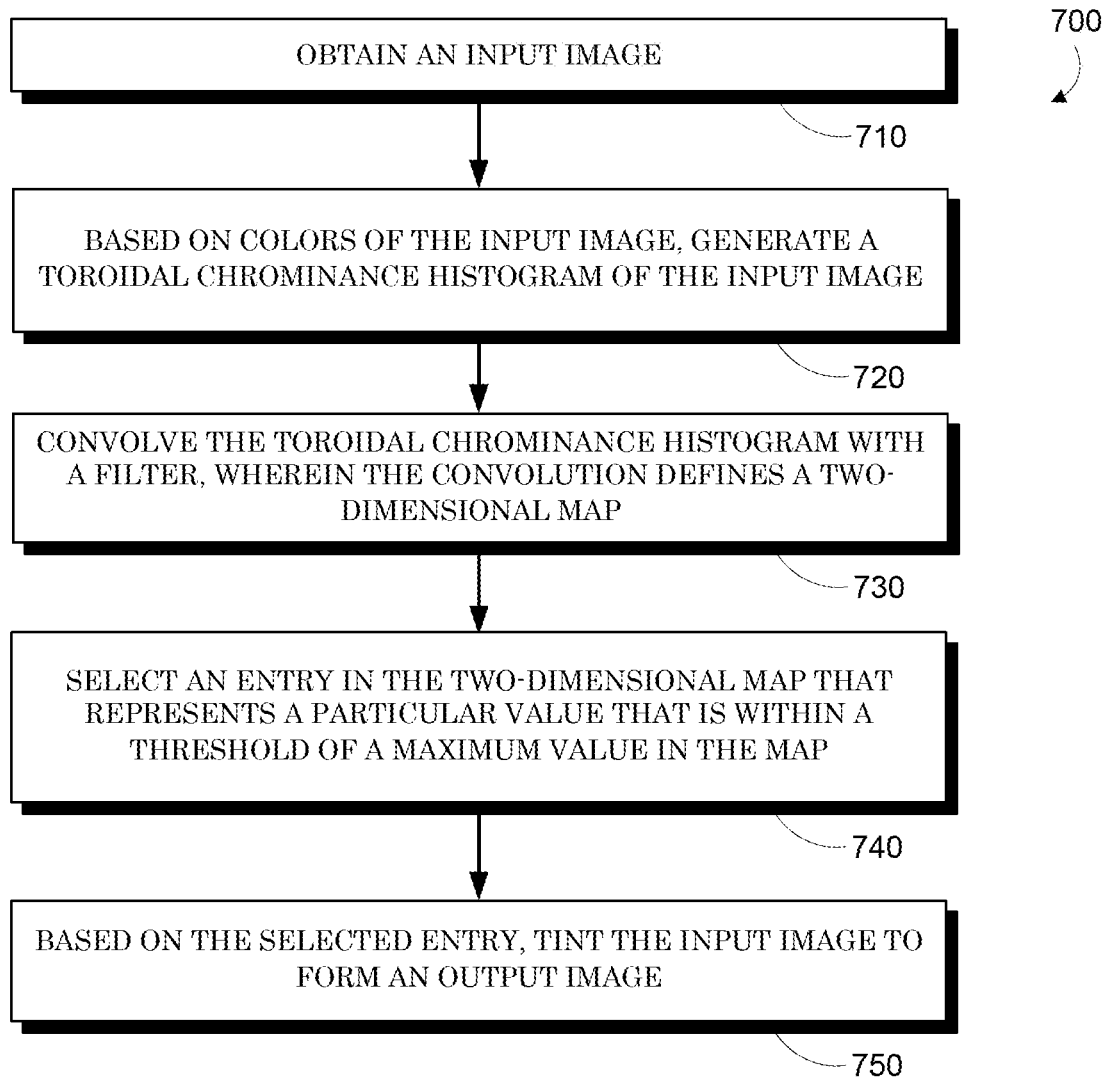
FIG. 7 is a flow chart, according to example embodiments.

FIG. 7 is a flow chart illustrating an example embodiment. The embodiment illustrated by FIG. 7 may be carried out by a computing device, such as digital camera device 500 or by computing device 600. However, the embodiment can be carried out by other types of devices or device subsystems. Further, the embodiment may be combined with any aspect or feature disclosed in this specification or the accompanying drawings.

The method 700 includes obtaining an input image (710). The method 700 additionally includes generating a toroidal chrominance histogram of the input image based on colors of the input image (720). The method 700 further includes convolving the toroidal chrominance histogram with a filter (730). This convolution defines a two-dimensional map. The method 700 also includes selecting an entry in the two-dimensional map that represents a particular value that is within a threshold of a maximum value in the map (740). The method 700 further includes tinting the input image, based on the selected entry, to form an output image (750).

The method 700 could include additional steps, features, or other elements. For example, the toroidal chrominance histogram generated as part of the method 700 could be a toroidal logarithmic chrominance histogram. The method 700 could additionally include de-aliasing the selected entry, and tinting the input image, based on the selected entry, to form an output image could include tinting the input image based on the de-aliased selected entry to form the output image. De-aliasing the selected entry could include (i) determining average chrominance values for the input image; and (ii) selecting a particular estimated luminance from a plurality of estimates associated with the selected entry such that tinting the input image to form an output image based on the particular estimated luminance causes the output image to exhibit a greater degree of neutral color than the input image. Additionally or alternatively, de-aliasing the selected entry could include selecting a particular estimated luminance from a plurality of estimates associated with the selected entry such that the particular estimated luminance is closer to a center of the toroidal chrominance histogram than any other estimate in the plurality of estimates associated with the selected entry. The method 700 could additionally include (i) determining a loss value based on the selected entry; and (ii) updating the filter based on the loss value. In some examples, selecting the entry in the two-dimensional map that represents the particular value that is within the threshold of the maximum value in the heat map could include mapping a per-color probability distribution function associated with the particular value to a bivariate von Mises distribution, where the bivariate von Mises distribution is estimated using a mean and a covariance matrix. In some such examples, the filter could be determined by way of machine learning over a plurality of training images with associated ground-truth white points. Determining the filter by way of machine learning over the plurality of training images with associated ground-truth white points could include minimizing a loss function to determine the filter. Such a loss function could be based on a negative log-likelihood of a Gaussian distribution with the mean and the covariance matrix. In some embodiments of the method 700, tinting the input image based on the selected entry could include applying the filter to the image, where the filter is parameterized by the selected entry. In some embodiments of the method 700, obtaining the input image could include: (i) obtaining a digital image; and (ii) constructing the input image as an n×n image that is smaller than the digital image, where each pixel of the input image is a sum of values associated with a set of pixels in the digital image that are separated by a multiple of n in either dimension. In such embodiments, obtaining the digital image could include a computing device capturing the digital image. In some embodiments of the method 700, the output image is more white-balanced than the input image.

Figure 8:
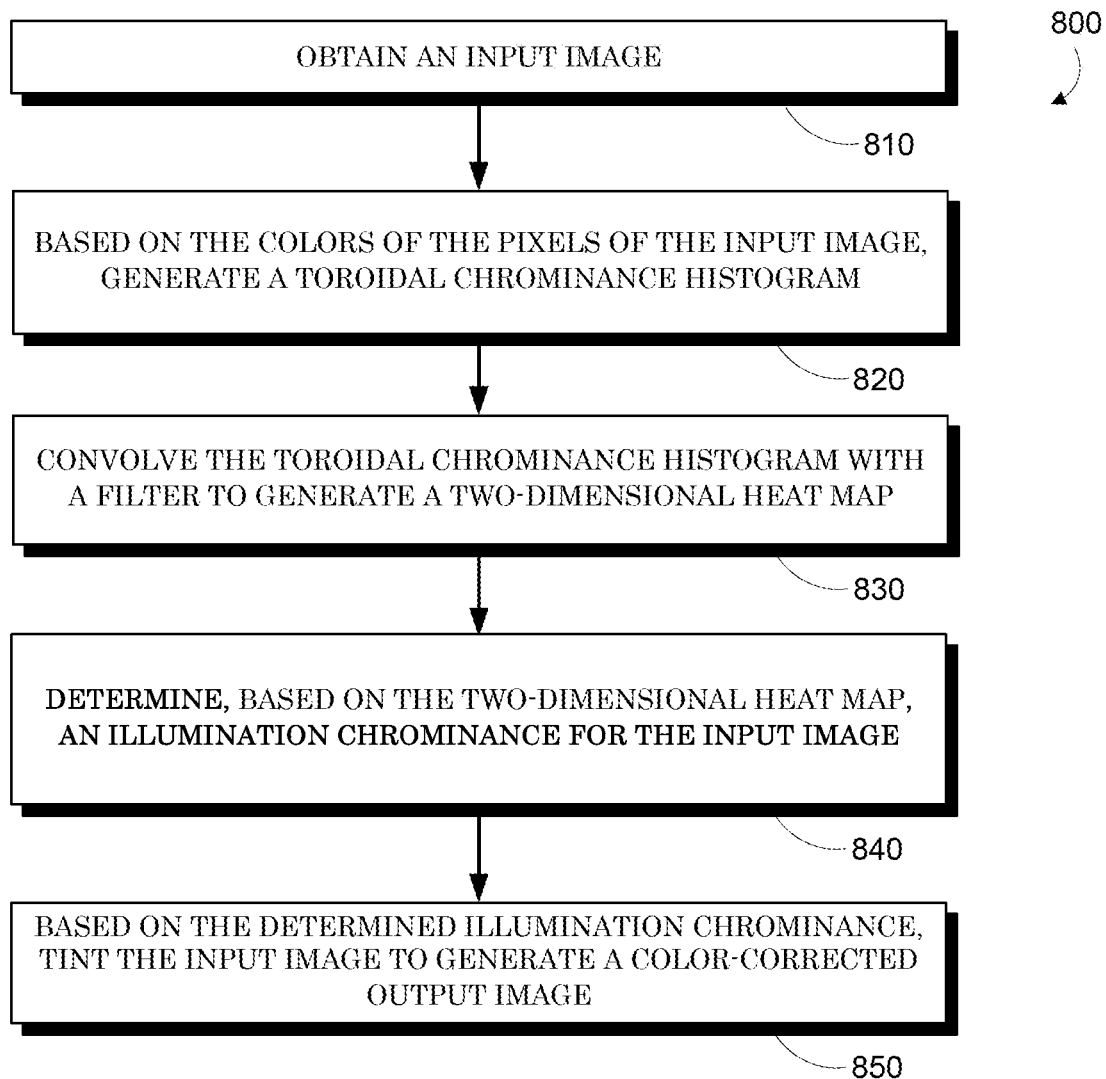
FIG. 8 is a flow chart, according to example embodiments.

FIG. 8 is a flow chart illustrating an example embodiment. The embodiment illustrated by FIG. 8 may be carried out by a computing device, such as digital camera device 500 or by computing device 600. However, the embodiment can be carried out by other types of devices or device subsystems. Further, the embodiment may be combined with any aspect or feature disclosed in this specification or the accompanying drawings.

The method 800 includes obtaining, by a computing device, an input image (810). The input image includes a plurality of pixels having respective colors. The method 800 additionally includes generating a toroidal chrominance histogram based on the colors of the pixels of the input image (820). Each element of the generated toroidal chrominance histogram corresponds to a number of pixels of the input image having chrominance values at a respective set of locations within a chrominance space. The set of locations within the chrominance space for a particular element of the toroidal chrominance histogram are regularly spaced within the chrominance space. The method 800 further includes convolving the toroidal chrominance histogram with a filter to generate a two-dimensional heat map (830). The method 800 also includes determining, based on the two-dimensional heat map, an illumination chrominance for the input image (840). The method 800 additionally includes tinting the input image, based on the determined illumination chrominance, to generate a color-corrected output image (850).

The method 800 could include additional steps, features, or other elements. For example, the toroidal chrominance histogram generated as part of the method 800 could be a toroidal logarithmic chrominance histogram. In some embodiments of the method 800, a central element of the toroidal chrominance histogram is located within a central region of the toroidal chrominance histogram, where a particular one of the set of locations within the chrominance space that corresponds to the central element of the toroidal chrominance histogram corresponds to an expected illumination chrominance. In some implementations of the method 800, determining an illumination chrominance for the input image comprises: (i) selecting one of the elements of the toroidal chrominance histogram; (ii) selecting, from the set of locations within the chrominance space that corresponds to the selected element of the toroidal chrominance histogram, a location within the chrominance space; and (iii) determining the illumination chrominance for the input image based on the selected location within the chrominance space. The method 800 could further include determining a mean chrominance of the input image. In such an embodiment, selecting, from the set of locations within the chrominance space that corresponds to the selected element of the toroidal chrominance histogram, a location within the chrominance space could include selecting, from the set of locations within the chrominance space, the location within the chrominance space that is most similar to the mean chrominance of the input image. In some embodiments of the method 800, determining an illumination chrominance for the input image based on the two-dimensional heat map includes determining a circular mean of the two-dimensional heat map. In some such embodiments of the method 800, determining an illumination chrominance for the input image based on the two-dimensional heat map further includes determining a covariance of the two-dimensional heat map about the determined circular mean. In some such embodiments of the method 800, the determined circular mean and covariance of the two-dimensional heat map correspond to a mean and a covariance of a bivariate von Mises distribution. The method 800 could additionally include: (i) obtaining a second input image, where the second input image comprises a second plurality of pixels having second respective colors; (ii) based on the colors of the pixels of the second input image, generating a second toroidal chrominance histogram, where each element of the second toroidal chrominance histogram corresponds to a number of pixels of the second input image having chrominance values at a second respective set of locations within the chrominance space, where the second set of locations within the chrominance space for a second particular element of the second toroidal chrominance histogram are regularly spaced within the chrominance space; (iii) convolving the second toroidal chrominance histogram with the filter to generate a second two-dimensional heat map; and (iv) based on the second two-dimensional heat map and the illumination chrominance determined for the first input image, determining a second illumination chrominance for the second input image. The method 800 could additionally include: (i) determining an augmented image based on the input image, where the augmented image comprises a further plurality of pixels having further respective colors; (ii) based on the colors of the pixels of the augmented image, generating an augmented toroidal chrominance histogram, where each element of the augmented toroidal chrominance histogram corresponds to a number of pixels of the augmented image having chrominance values at a further respective set of locations within the chrominance space, where the further set of locations within the chrominance space for a further particular element of the augmented toroidal chrominance histogram are regularly spaced within the chrominance space; and (iii) convolving the augmented toroidal chrominance histogram with a further filter to generate an augmented two-dimensional heat map, where determining the illumination chrominance for the input image includes determining the illumination chrominance based on the augmented two-dimensional heat map. In some embodiments of the method 800, obtaining an input image includes operating an image sensor to generate the input image.

Figure 9:
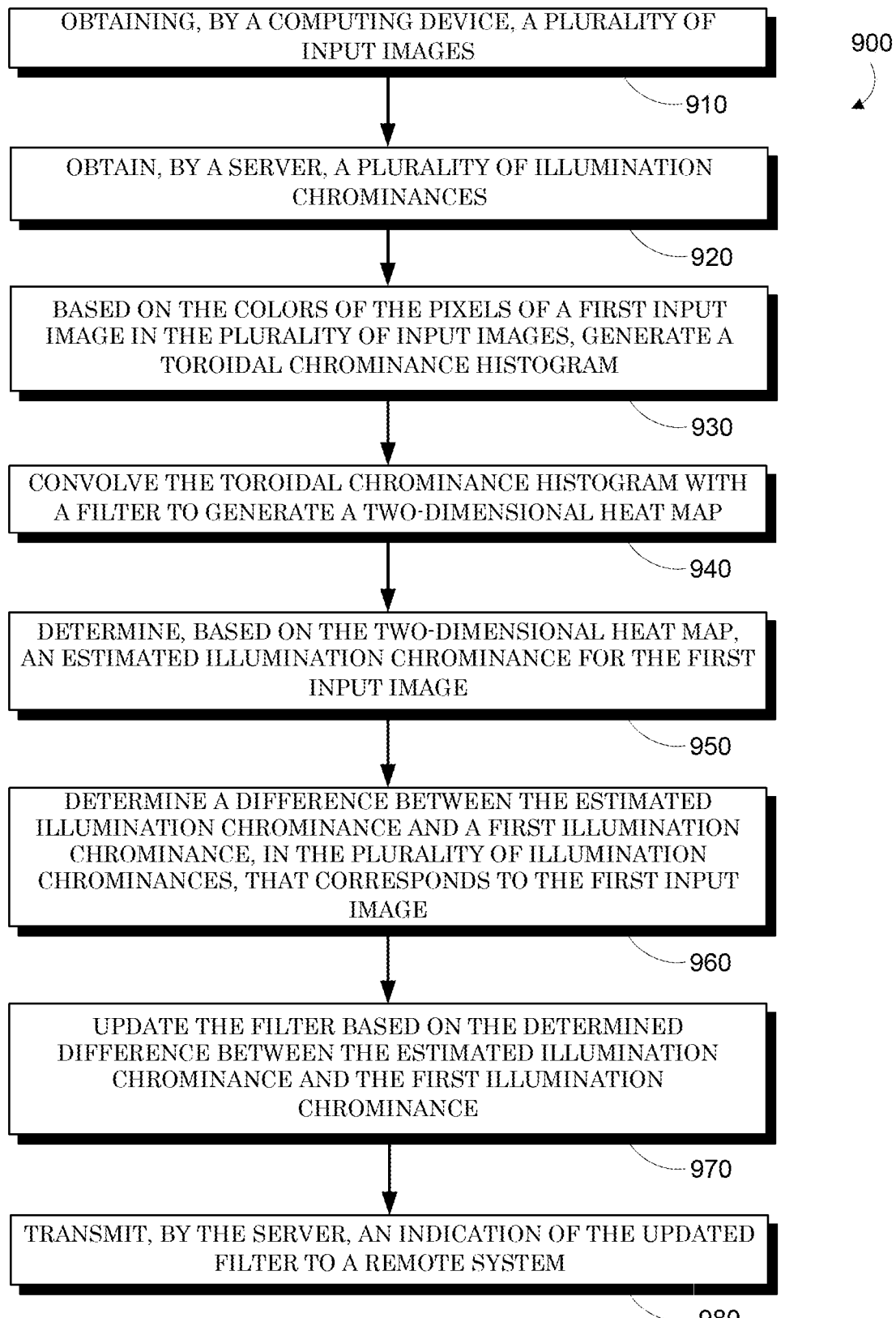
FIG. 9 is a flow chart, according to example embodiments.

FIG. 9 is a flow chart illustrating an example embodiment. The embodiment illustrated by FIG. 9 may be carried out by a computing device, such as digital camera device 500 or by computing device 600. However, the embodiment can be carried our by other types of devices or device subsystems. Further, the embodiment may be combined with any aspect or feature disclosed in this specification or the accompanying drawings.

The method 900 includes obtaining, by a computing device, a plurality of input images (910). Each input image in the plurality of input images includes a plurality of pixels having respective colors. The method 900 additionally includes obtaining, by a server, a plurality of illumination chrominances (920). Each illumination chrominance in the plurality of illumination chrominances corresponds to a respective input image in the plurality of input images. The method 900 also includes generating a toroidal chrominance histogram based on the colors of the pixels of a first input image in the plurality of input images (930). Each element of the toroidal chrominance histogram corresponds to a number of pixels of the first input image having chrominance values at a respective set of locations within a chrominance space. The set of locations within the chrominance space for a particular element of the toroidal chrominance histogram are regularly spaced within the chrominance space. The method 900 also includes convolving the toroidal chrominance histogram with a filter to generate a two-dimensional heat map (940). The method 900 additionally includes determining, based on the two-dimensional heat map, an estimated illumination chrominance for the first input image (950). The method 900 further includes determining a difference between the estimated illumination chrominance and a first illumination chrominance, in the plurality of illumination chrominances, that corresponds to the first input image (960). The method 900 also includes updating the filter, based on the determined difference between the estimated illumination chrominance and the first illumination chrominance, to generate an updated filter (970). The method 900 further includes transmitting, by the server, an indication of the updated filter to a remote system (980).

The method 900 could include additional steps, features, or other elements. For example, the toroidal chrominance histogram generated as part of the method 900 could be a toroidal logarithmic chrominance histogram. In some embodiments of the method 900, a central element of the toroidal chrominance histogram is located within a central region of the toroidal chrominance histogram, and a particular one of the set of locations within the chrominance space that corresponds to the central element of the toroidal chrominance histogram corresponds to an expected illumination chrominance. In some embodiments of the method 900, determining an estimated illumination chrominance for the first input image includes: (i) selecting one of the elements of the toroidal chrominance histogram; (ii) selecting, from the set of locations within the chrominance space that corresponds to the selected element of the toroidal chrominance histogram, a location within the chrominance space; and (iii) determining the estimated illumination chrominance for the first input image based on the selected location within the chrominance space. The method 900 could additionally include determining a mean chrominance of the first input image and selecting, from the set of locations within the chrominance space that corresponds to the selected element of the toroidal chrominance histogram, a location within the chrominance space could include selecting, from the set of locations within the chrominance space, the location within the chrominance space that is most similar to the mean chrominance of the first input image. In some embodiments of the method 900, determining an estimated illumination chrominance for the first input image based on the two-dimensional heat map includes determining a circular mean of the two-dimensional heat map. In some embodiments of the method 900, determining an estimated illumination chrominance for the first input image based on the two-dimensional heat map further includes determining a covariance of the two-dimensional heat map about the determined circular mean. In some such embodiments of the method 900, the determined circular mean and covariance of the two-dimensional heat map correspond to a mean and a covariance of a bivariate von Mises distribution. The method 900 could additionally include: (i) determining an augmented image based on the first input image, wherein the augmented image comprises a further plurality of pixels having further respective colors; (ii) based on the colors of the pixels of the augmented image, generating an augmented toroidal chrominance histogram, where each element of the augmented toroidal chrominance histogram corresponds to a number of pixels of the augmented image having chrominance values at a further respective set of locations within the chrominance space, where the further set of locations within the chrominance space for a further particular element of the augmented toroidal chrominance histogram are regularly spaced within the chrominance space; and (iii) convolving the augmented toroidal chrominance histogram with a further filter to generate a further augmented two-dimensional heat map, where determining the estimated illumination chrominance for the first input image includes determining the estimated illumination chrominance based on the augmented two-dimensional heat map. In some embodiments of the method 900, transmitting, by the server, an indication of the updated filter to a remote system includes transmitting an indication of the updated filter to an image capture device.

VI. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   obtaining an input image;
   based on colors of the input image, generating a toroidal chrominance histogram of the input image. wherein each element of the toroidal chrominance histogram corresponds to a number of pixels of the input image having chrominance values at a respective set of locations within a chrominance space;
   convolving the toroidal chrominance histogram with a filter, wherein the convolution defines a two-dimensional map;
   selecting an entry in the two-dimensional map that represents a particular value that is within a threshold of a maximum value in the map; and
   based on the selected entry, tinting the input image to form an output image.

2. The method of claim 1, further comprising:
   de-aliasing the selected entry and tinting the input image based on the de-aliased selected entry to form the output image.

3. The method of claim 2, wherein de-aliasing the selected entry comprises:
   determining average chrominance values for the input image; and
   selecting a particular estimated luminance from a plurality of estimates associated with the selected entry such that tinting the input image to form an output image based on the particular estimated luminance causes the output image to exhibit a greater degree of neutral color than the input image.

4. The method of claim 2, wherein de-aliasing the selected entry comprises:
   selecting a particular estimated luminance from a plurality of estimates associated with the selected entry such that the particular estimated luminance is closer to a center of the toroidal chrominance histogram than any other estimate in the plurality of estimates associated with the selected entry.

5. The method of claim 1, wherein selecting the entry in the two-dimensional map that represents the particular value that is within the threshold of the maximum value in the map comprises:
   mapping a per-color probability distribution function associated with they particular value to a bivariate von Mises distribution, wherein the hivariate von Mises distribution is estimated using a mean and a covariance matrix.

6. The method of claim 1, further comprising:
   determining the filter using machine learning over a plurality of training images with associated ground-truth white points.

7. A method comprising:
   obtaining, by a computing device, an input image, wherein the input image comprises a plurality of pixels having respective colors;
   based on the colors of the pixels of the input image, generating a toroidal chrominance histogram, wherein each element of the toroidal chrominance histogram corresponds to a number of pixels of the input image having chrominance values at a respective set of locations within a chrominance space, wherein the set of locations within the chrominance space for a particular element of the toroidal chrominance histogram are regularly spaced within the chrominance space;
   convolving the toroidal chrominance histogram with a filter to generate a two-dimensional heat map;
   determining an illumination chrominance for the input image, wherein the illumination chrominance is determined based on the two-dimensional heat map; and
   based on the determined illumination chrominance, tinting the input image to generate a color-corrected output image.

8. The method of claim 7, wherein a central element of the toroidal chrominance histogram is located within a central region of the toroidal chrominance histogram, and wherein a particular one of the set of locations within the chrominance space that corresponds to the central element of the toroidal chrominance histogram corresponds to an expected illumination chrominance.

9. The method of claim 7, wherein determining an illumination chrominance for the input image comprises:
   selecting one of the elements of the toroidal chrominance histogram;
   selecting, from the set of locations within the chrominance space that corresponds to the selected element of the toroidal chrominance histogram, a location within the chrominance space; and
   determining the illumination chrominance for the input image based on the selected location within the chrominance space.

10. The method of claim 9, further comprising:
    determining a mean chrominance of the input image;
    wherein selecting, from the set of locations within the chrominance space that corresponds to the selected element of the toroidal chrominance histogram, a location within the chrominance space comprises selecting, from the set of locations within the chrominance space, the location within the chrominance space that is most similar to the mean chrominance of the input image.

11. The method of claim 7, wherein determining an illumination chrominance for the input image based on the two-dimensional heat map comprises determining a circular mean of the two-dimensional heat map.

12. The method of claim 11, wherein determining an illumination chrominance for the input image based on the two-dimensional heat map further comprises determining a covariance of the two-dimensional heat map about the determined circular mean.

13. The method of claim 12, wherein the determined circular mean and covariance of the two-dimensional heat map correspond to a mean and a covariance of a bivariate von Mises distribution.

14. The method of claim 7, wherein the input image is a first input image, and the method further comprising:
obtaining a second input image, wherein the second input image comprises a second plurality of pixels having second respective colors;
based on the colors of the pixels of the second input image, generating a second toroidal chrominance histogram, wherein each element of the second toroidal chrominance histogram corresponds to a number of pixels of the second input image having chrominance values at a second respective set of locations within the chrominance space, wherein the second set of locations within the chrominance space for a second particular element of the second toroidal chrominance histogram are regularly spaced within the chrominance space;
convolving the second toroidal chrominance histogram with the filter to generate a second two-dimensional heat map; and
based on the second two-dimensional heat map and the illumination chrominance determined for the first input image, determining a second illumination chrominance for the second input image.

15. The method of claim 7, further comprising:
determining an augmented image based on the input image, wherein the augmented image comprises a further plurality of pixels having further respective colors;
based on the colors of the pixels of the augmented image, generating an augmented toroidal chrominance histogram, wherein each element of the augmented toroidal chrorninance histogram corresponds to a number of pixels of the augmented image having chrominance values at a further respective set of locations within the chrominance space, wherein the further set of locations within the chrominance space for a further particular element of the augmented toroidal chrominance histogram are regularly spaced within the chrominance space; and
convolving the augmented toroidal chrominance histogram with a further filter to generate an augmented two-dimensional heat map;
wherein determining the illumination chrominance for the input image comprises determining the illumination chrominance based on the augmented two-dimensional heat map.

16. An image capture device comprising:
an image sensor;
at least one processor;
memory; and
program instructions, stored in the memory, that upon execution by the at least one processor cause the image capture device to perform operations comprising:
operating the image sensor to obtain an input image;
based on colors of the input image, generating a toroidal chrominance histogram of the input image, wherein each element of the toroidal chrominance histogram corresponds to a number of pixels of the input image having chrominance values at a respective set of locations within a chrominance space;
convolving the toroidal chrominance histogram with a filter, wherein the convolution defines a two-dimensional map;
selecting an entry in the two-dimensional map that represents a particular value that is within a threshold of a maximum value in the map; and
based on the selected entry, tinting the input image to form an output image.

17. The image capture device of claim 16, wherein the operations further comprise:
de-aliasing the selected entry and tinting the input image based on the de-aliased selected entry to form the output image.

18. The image capture device of claim 17, wherein de-aliasing the selected entry comprises:
determining average chrominance values for the input image; and
selecting a particular estimated luminance from a plurality of estimates associated with the selected entry such that tinting the input image to form an output image based on the particular estimated luminance causes the output image to exhibit a greater degree of neutral color than the input image.

19. The image capture device of claim 17, wherein de-aliasing the selected entry comprises:
selecting a particular estimated luminance from a plurality of estimates associated with the selected entry such that the particular estimated luminance is closer to a center of the toroidal chrominance histogram than any other estimate in the plurality of estimates associated with the selected entry.

20. The image capture device of claim 16, wherein selecting the entry in the two-dimensional map that represents the particular value that is within the threshold of the maximum value in the map comprises:
mapping a per-color probability distribution function associated with the particular value to a bivariate von Mises distribution, wherein the bivariate von Mises distribution is estimated using a mean and a covariance matrix.

* * * * *